(12) United States Patent
Kunz et al.

(10) Patent No.: US 8,327,487 B2
(45) Date of Patent: Dec. 11, 2012

(54) VACUUM FILTER CLEANING DEVICE

(75) Inventors: Michael P. Kunz, Hampstead, MD (US); Gregg L. Sheddy, Shrewsbury, PA (US); Katherine E. Phelan, Towson, MD (US)

(73) Assignee: Black & Decker Inc., Newark, DE (US)

( * ) Notice: Subject to any disclaimer, the term of this patent is extended or adjusted under 35 U.S.C. 154(b) by 994 days.

(21) Appl. No.: 12/358,823

(22) Filed: Jan. 23, 2009

(65) Prior Publication Data

US 2010/0011530 A1   Jan. 21, 2010

Related U.S. Application Data

(60) Provisional application No. 61/025,053, filed on Jan. 31, 2008, provisional application No. 61/083,157, filed on Jul. 23, 2008.

(51) Int. Cl.
*A47L 3/00* (2006.01)
(52) U.S. Cl. .................................. 15/3; 15/344; 15/352
(58) Field of Classification Search ................. 15/3, 344, 15/352
See application file for complete search history.

(56) References Cited

U.S. PATENT DOCUMENTS

| | | | |
|---|---|---|---|
| 1,864,622 A | 6/1932 | Sutherland | |
| 2,522,882 A | 9/1950 | Lofgren | |
| 2,570,307 A | 10/1951 | Bell et al. | |
| 3,236,032 A | 2/1966 | Yasukawa et al. | |
| 3,320,726 A | 5/1967 | Black, Jr. | |
| 3,591,888 A * | 7/1971 | Takeda et al. | 15/323 |
| 3,639,940 A | 2/1972 | Carlson et al. | |
| 3,708,962 A | 1/1973 | Deguchi et al. | |
| 3,841,067 A | 10/1974 | Kato et al. | |
| 3,936,904 A | 2/1976 | Bashark | |
| 4,345,353 A | 8/1982 | Sommerfeld | |
| 4,425,813 A | 1/1984 | Wadensten | |
| 4,583,414 A | 4/1986 | Wadensten | |
| 4,675,032 A | 6/1987 | Genovese et al. | |
| 4,787,923 A * | 11/1988 | Fleigle et al. | 55/304 |
| 4,819,676 A | 4/1989 | Blehert et al. | |
| 4,833,753 A | 5/1989 | Müller | |
| 4,921,510 A | 5/1990 | Plooy | |
| 5,156,660 A | 10/1992 | Wilson | |
| 5,603,740 A | 2/1997 | Roy | |
| 5,647,093 A | 7/1997 | Engel et al. | |

(Continued)

FOREIGN PATENT DOCUMENTS

EP   1 504 710 A2   2/2005

(Continued)

*Primary Examiner* — Lee D Wilson
*Assistant Examiner* — Shantese McDonald
(74) *Attorney, Agent, or Firm* — Harness, Dickey & Pierce, P.L.C.

(57) ABSTRACT

A vacuum may include a housing defining a suction inlet opening and a debris chamber in communication with the suction inlet opening, a suction device disposed in the housing for providing a vacuum pressure to the inlet opening, a filter disposed in an airflow path between the suction inlet opening and the suction device, and a motor driving a device for disengaging debris from the filter. The device for disengaging debris from the filter may include at least one finger disposed on a belt or a rake. The device for disengaging debris from the filter may include a vibration device that induces a vibration in the filter. A controller can allow electric current to actuate the device for disengaging debris from the filter. The controller can have a plurality of operational modes.

14 Claims, 16 Drawing Sheets

U.S. PATENT DOCUMENTS

| | | | |
|---|---|---|---|
| 5,681,363 | A | 10/1997 | Tucker et al. |
| 5,711,775 | A | 1/1998 | Field et al. |
| 5,829,094 | A | 11/1998 | Field et al. |
| 6,026,539 | A | 2/2000 | Mouw et al. |
| 6,029,309 | A | 2/2000 | Imamura |
| 6,117,200 | A | 9/2000 | Berg et al. |
| 6,569,218 | B2 | 5/2003 | Dudley |
| 6,598,263 | B2 | 7/2003 | Boles et al. |
| 6,625,845 | B2 | 9/2003 | Matsumoto et al. |
| 6,638,329 | B2 * | 10/2003 | Gerold .......................... 55/295 |
| 6,758,874 | B1 | 7/2004 | Hunter, Jr. |
| 6,969,310 | B1 | 11/2005 | Ghilardi |
| 7,012,685 | B1 | 3/2006 | Wilson |
| 7,074,248 | B2 | 7/2006 | Jin et al. |
| 7,152,276 | B2 | 12/2006 | Jin et al. |
| 7,152,277 | B2 | 12/2006 | Jung et al. |
| 7,198,656 | B2 | 4/2007 | Takemoto et al. |
| 7,208,024 | B2 | 4/2007 | Weber |
| 7,222,392 | B2 | 5/2007 | McCormick et al. |
| 2005/0091784 | A1 * | 5/2005 | Bone .............................. 15/344 |
| 2005/0132528 | A1 | 6/2005 | Yau |
| 2005/0198766 | A1 | 9/2005 | Nam et al. |
| 2005/0217067 | A1 | 10/2005 | Rew et al. |
| 2007/0209148 | A1 * | 9/2007 | Yacobi et al. ................... 15/352 |

FOREIGN PATENT DOCUMENTS

GB  2 055 617  A  3/1981

* cited by examiner

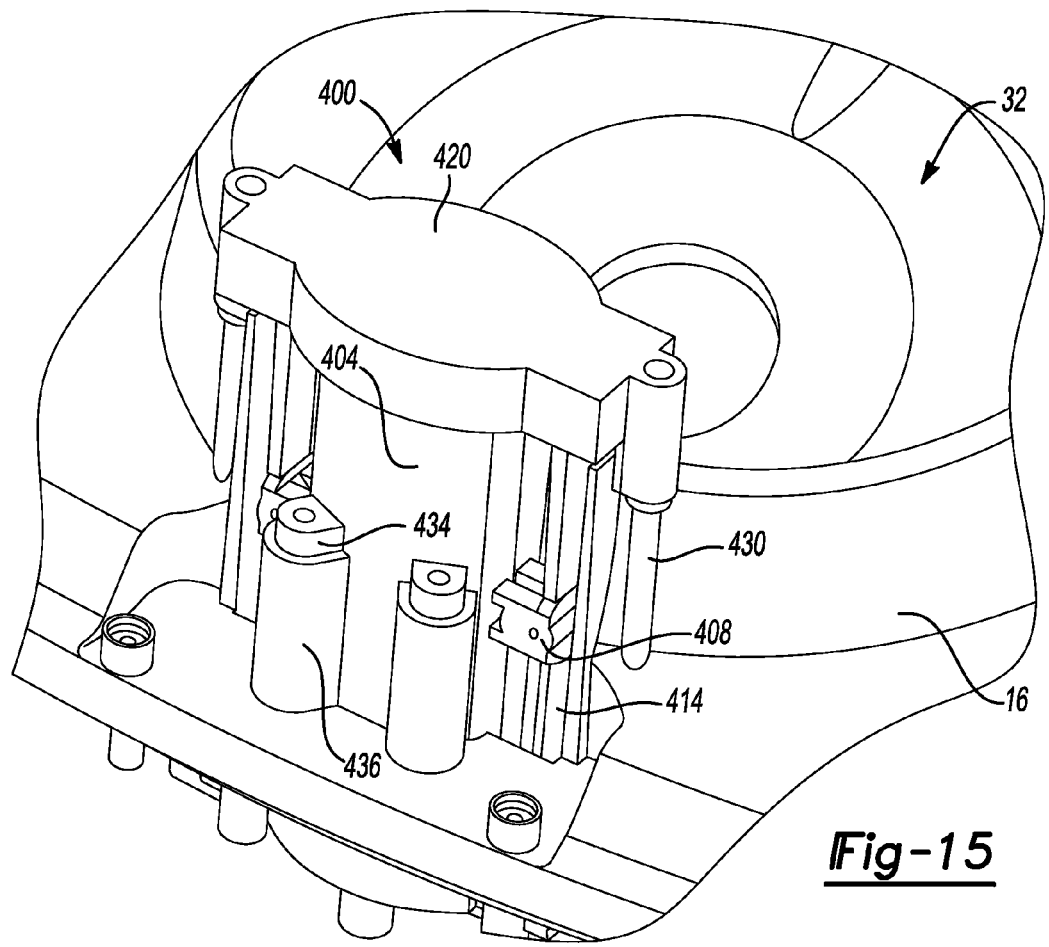
Fig-15
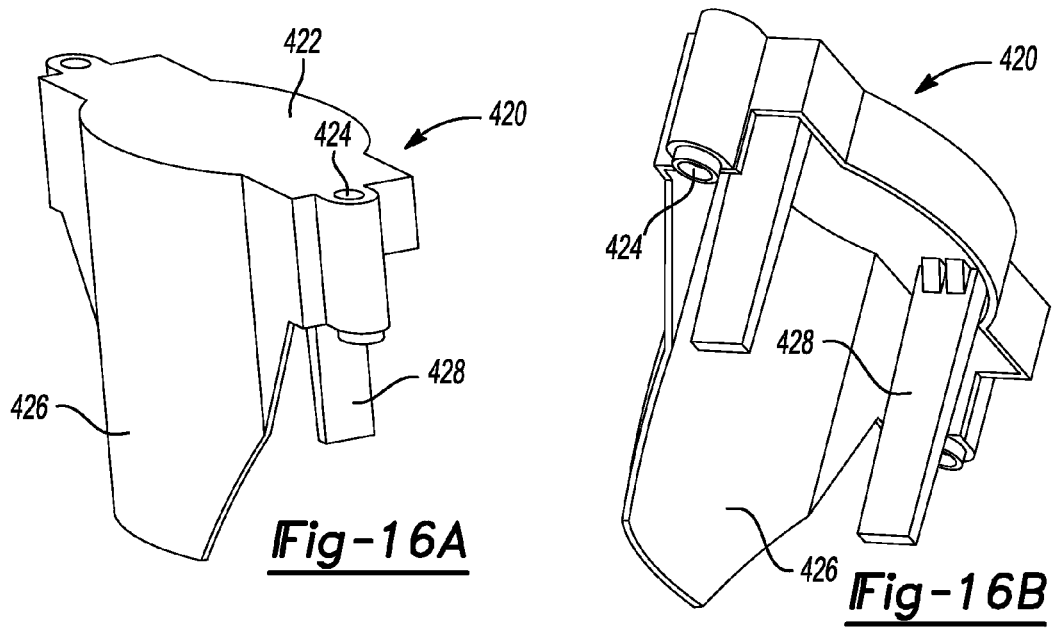
Fig-16A
Fig-16B

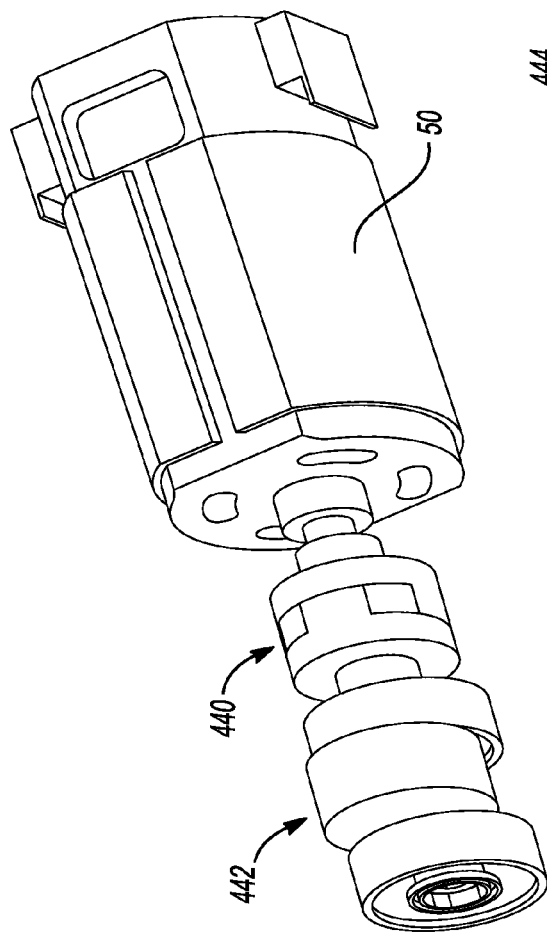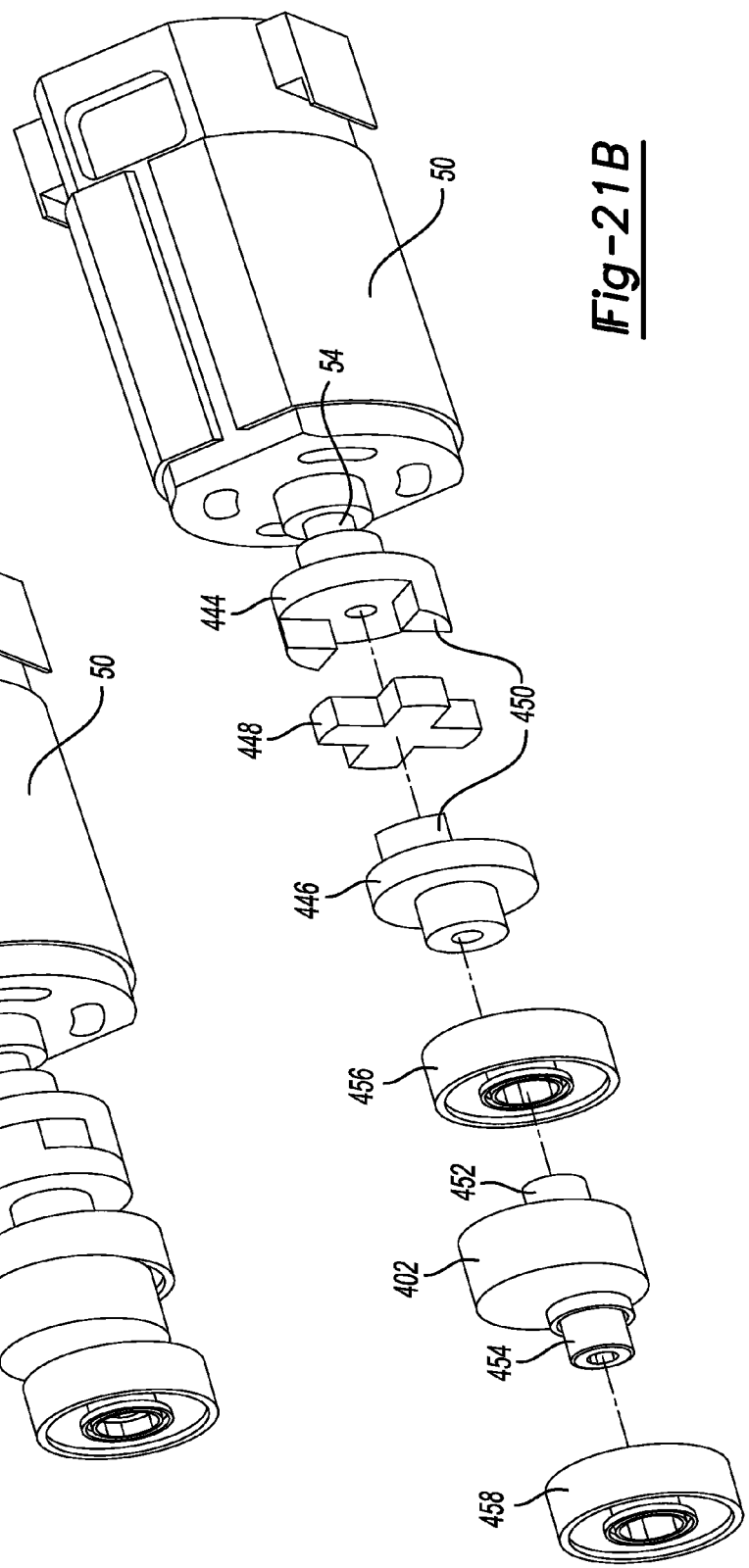

VACUUM FILTER CLEANING DEVICE

CROSS-REFERENCE TO RELATED APPLICATIONS

This application claims the benefit of U.S. Provisional Application No. 61/025,053, filed on Jan. 31, 2008, and U.S. Provisional Application No. 61/083,157, filed on Jul. 23, 2008. The entire disclosures of each of the above applications are incorporated herein by reference.

FIELD

The present disclosure relates to a vacuum, and more particularly, to a vacuum having a filter cleaning device.

BACKGROUND

The statements in this section merely provide background information related to the present disclosure and may not constitute prior art.

Vacuums, particularly industrial shop vacuums may include a filter which separates dust, dirt, and other debris from an airflow path drawn into an intake port of the vacuum by a suction device. Some of the debris may attach to the filter and may accumulate thereon. As the debris builds up on the filter, the airflow path of the vacuum may be restricted, hindering suction power and efficiency, and rendering the vacuum less effective in picking up material.

Typically, the filter must be removed from the vacuum and cleaned by hand, which may be cumbersome and messy. Debris build-up on the filter may occur rapidly, which may require frequent filter cleaning to maintain optimal airflow, suction power, and efficiency. Frequent filter cleaning may be time consuming and may disrupt and/or inconvenience an operator during use of the vacuum.

SUMMARY

A vacuum may include a housing defining a suction inlet opening and a debris chamber in communication with the suction inlet opening, a suction device disposed in the housing for providing a vacuum pressure to the inlet opening, a filter disposed in an airflow path between the suction inlet opening and the suction device, and a motor driving a device for disengaging debris from the filter. The device for disengaging debris from the filter may include at least one finger disposed on a motor-driven belt or rake.

A vacuum may include a housing defining a suction inlet opening and a debris chamber in communication with the suction inlet opening. A suction device can be disposed in the housing for providing a vacuum pressure to the inlet opening. A filter can be disposed in an airflow path between the suction inlet opening and the suction device. A filter cleaning mechanism can induce vibration in the filter thereby disengaging debris from the filter. The filter cleaning mechanism can include a cam having a lobe and a strike plate disposed between the lobe and the filter. The lobe contacts the strike plate and induces the vibration in the filter through the strike plate. The filter cleaning mechanism can further include a motor driving the cam, thereby causing the lobe to periodically displace the strike plate and generate the vibration. The filter cleaning mechanism can further include a filter insert contacting the filter. The filter insert can be disposed between the strike plate and the filter.

A vacuum can include a first housing defining a suction inlet opening and a debris chamber in communication with the suction inlet opening. A suction device can be disposed in the first housing for providing a vacuum pressure to the inlet opening. A filter can be disposed in the air flow path between the suction inlet opening and the suction device. A filter cleaning mechanism can induce a vibration in the filter, thereby disengaging debris from the filter. The filter cleaning mechanism can include a motor coupled to the first housing and an eccentric mass that is rotated by the motor. Rotation of the eccentric mass by the motor induces the vibration in the filter.

The motor can be movably coupled to the first housing and rotation of the eccentric mass by the motor can cause the motor to move relative to the first housing and induce the vibration in the filter. The motor, the eccentric mass, and a second housing containing the motor and the eccentric mass can swing about an axis relative to the first housing and induce the vibration in the filter.

A vacuum can include a housing defining a suction inlet opening and a debris chamber in communication with the suction inlet opening. A suction device can be disposed in the housing for providing a vacuum pressure to the inlet opening. A filter can be disposed in an air flow path between the suction inlet opening and the suction device. A filter cleaning mechanism can disengage debris from the filter. The filter cleaning mechanism can include an electrically actuated motor. A control module can control the filter cleaning mechanism. The control module can allow a plurality of operating modes that causes an electrical current to actuate the motor of the filter cleaning mechanism by sending a signal to close a switch that electrically connects the motor of the filter cleaning mechanism to a power source. The plurality of operating modes includes: (1) an automatic mode wherein the control module commands operation of the filter cleaning mechanism in response to at least one predetermined event; (2) a power-off mode wherein the control module commands operation of the filter cleaning mechanism upon termination of operation of the suction device; and (3) a manual mode wherein the control module commands operation of the filter cleaning mechanism.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 15 is a perspective view of a filter cleaning system according to the principles of the present disclosure;

FIGS. 16A and 16B are perspective views of a trap utilized in the filter cleaning system of FIG. 15;

FIGS. 21A and 21B are an assembled view and an exploded view, respectively, of the filter cleaning mechanism of FIG. 20 removed from the shell;

DETAILED DESCRIPTION

Figure 1:
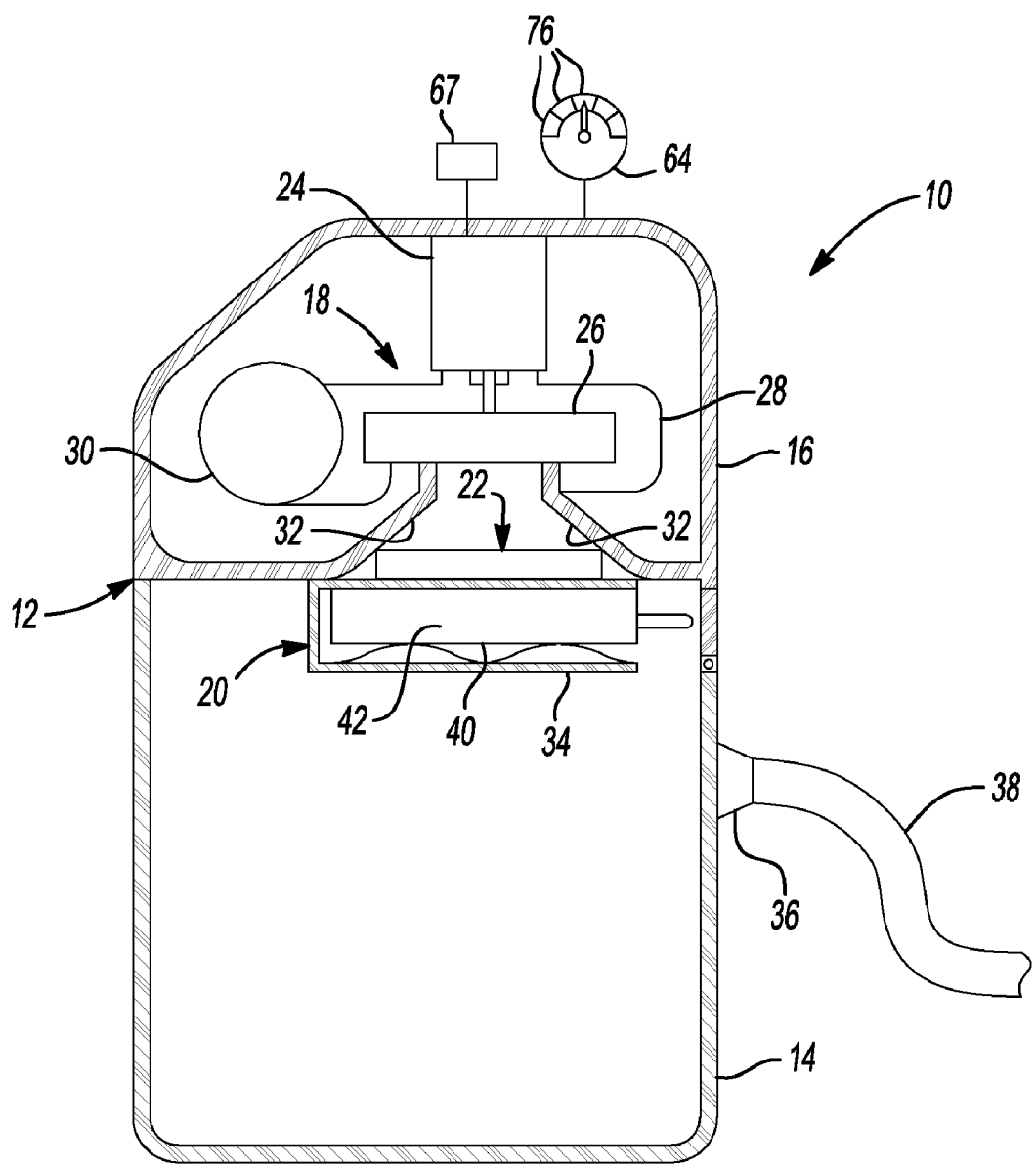
FIG. 1 is a schematically represented cross-sectional view of a vacuum having a filter cleaning system according to the principles of the present disclosure.

The following description is merely exemplary in nature and is not intended to limit the present disclosure, application, or uses. It should be understood that throughout the drawings, corresponding reference numerals indicate like or corresponding parts and features.

With reference to FIGS. 1-10, a vacuum 10 is provided and may include a housing 12, which may be formed from a debris chamber (or canister) 14 and a vacuum head 16 that closes the canister 14. The vacuum 10 may also include a suction device 18, a filter assembly 20, and a filter cleaning system 22. The filter cleaning system 22 may disengage accumulated dust, dirt, and/or other debris (hereinafter "debris") from the filter assembly 20, facilitating efficient operation of the vacuum 10. It should be appreciated that the vacuum 10 may be any type of vacuum, such as, for example, an industrial shop vacuum, an upright vacuum, a handheld vacuum, or any other vacuum having a filter.

The suction device 18 may include a vacuum motor 24 supporting a suction fan 26, which may be provided in a fan chamber 28 of the vacuum head 16. The fan chamber 28 may be in fluid communication with an exhaust port 30 and an intake port 32. The intake port 32 may be covered by the filter assembly 20, which may be situated in a filter housing 34 of the vacuum head 16. The filter assembly 20 may be in sealed engagement with an opening of the intake port 32.

The vacuum motor 24 may rotate the suction fan 26 to draw air into a suction inlet opening 36 and through an airflow path through the canister 14, through the filter assembly 20, through the intake port 32, and into the fan chamber 28. The suction fan 26 may force the air in the fan chamber 28 through the exhaust port 30 and out of the vacuum 10. A hose 38 may be attached to the suction inlet opening 36.

Figure 3:
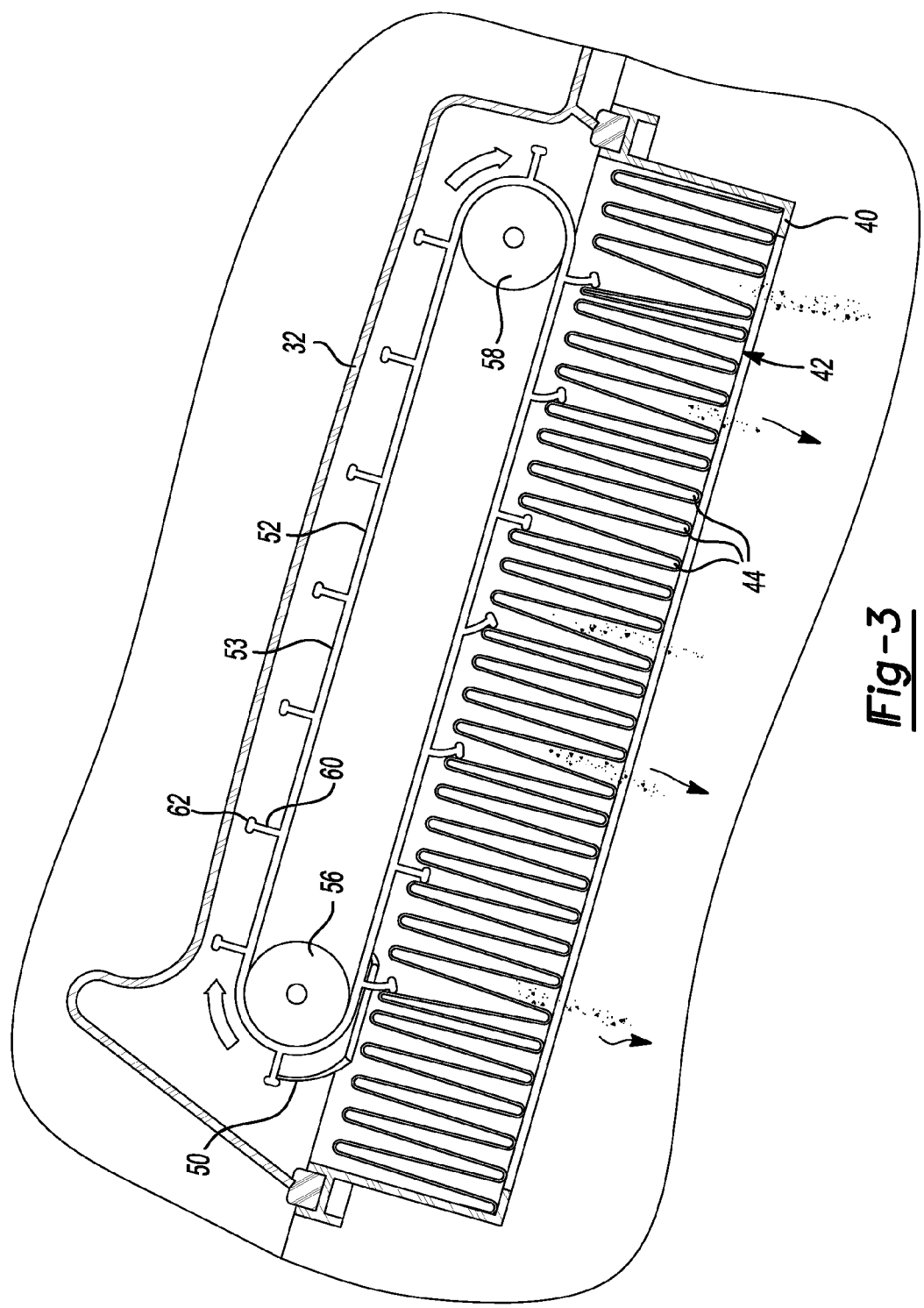
FIG. 3 is a cross-sectional view of the filter cleaning system of FIG. 2 engaged with a filter.
Figure 9:
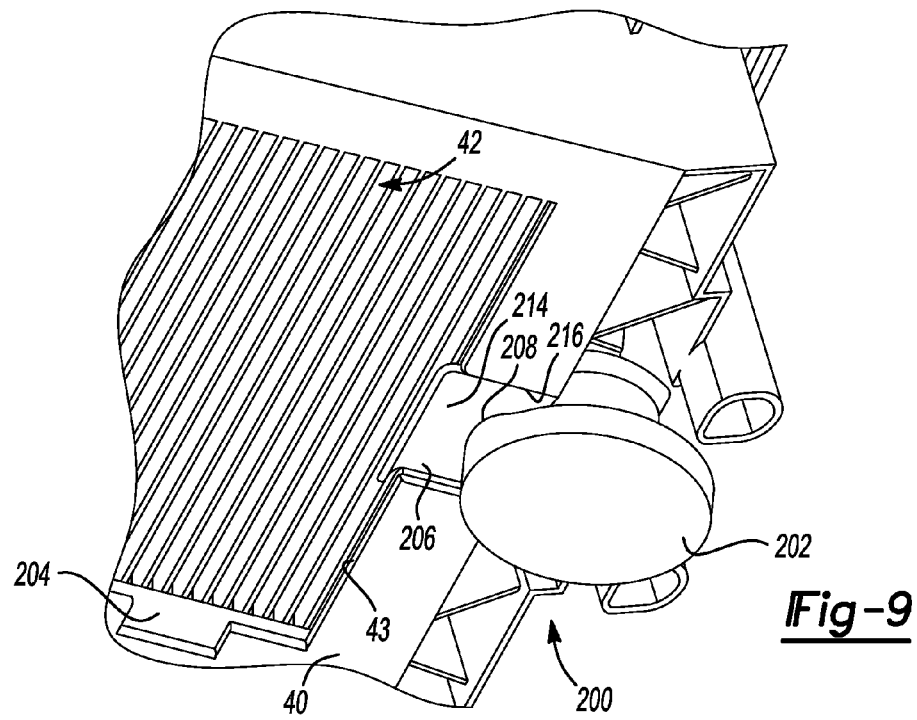
FIG. 9 is a perspective view of a filter cleaning system according to the principles of the present disclosure.

The filter assembly 20 may include a frame 40 supporting a panel filter 42 (see, e.g., FIGS. 1, 3, and 9). The frame 40 may include an aperture 43 (shown best in FIG. 9) through which air may flow from the suction inlet opening 36, and subsequently flow through the filter 42 and into the intake port 32. The filter 42 may include a paper filter media having a plurality of pleats 44. Alternatively, the filter 42 may have a flat (or planar) construction, and may be fabricated from numerous alternative materials that are known in the art.

The filter 42 may be sufficiently porous so as to allow air to flow therethrough, while being a sufficient barrier so as to prevent debris from passing therethrough. Accordingly, the filter 42 allows air drawn in through the suction inlet opening 36 to flow into the intake port 32 and through the vacuum head 16 (as described above), while preventing debris drawn through the suction inlet opening 36 from flowing into the intake port 32. Once separated from the airflow path, some of the debris may fall from the filter 42 into the canister 14 for subsequent disposal, while some of the debris may accumulate on the filter 42.

With reference to FIGS. 1-6, the filter cleaning system 22 may include a filter cleaning mechanism 46 and a control system 48. The filter cleaning mechanism 46 may be disposed between the suction device 18 and the filter 42 and may include a cleaning mechanism motor 50 and a belt 52.

Figure 4:
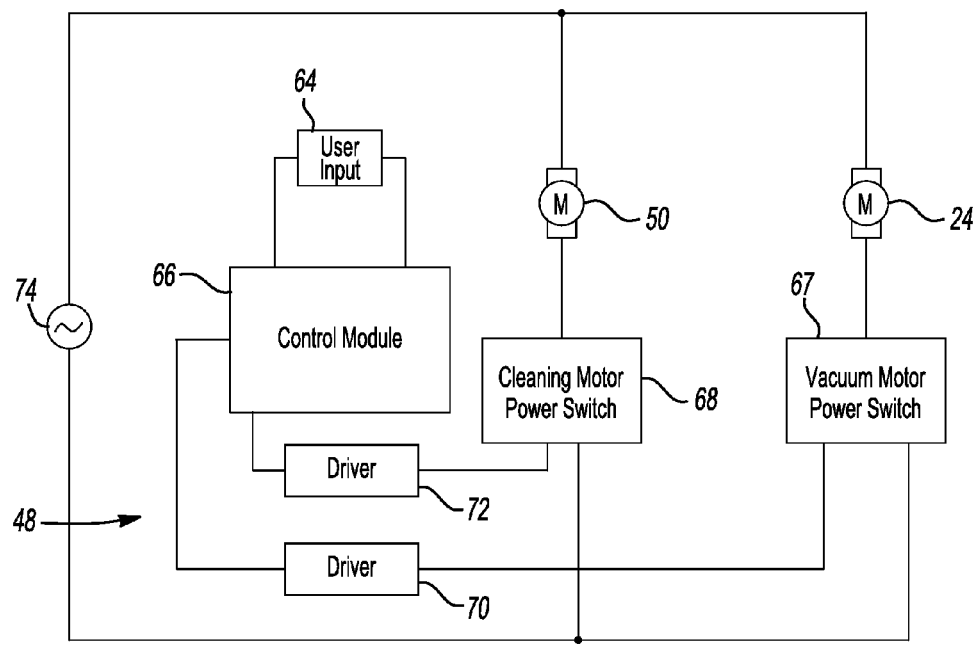
FIG. 4 is a circuit diagram of a control system of the filter cleaning system according to the principles of the present disclosure.

The cleaning mechanism motor 50 may be mounted to the intake port 32 or any other suitable location proximate thereto. The cleaning mechanism motor 50 may rotationally drive an output shaft 54 when the cleaning mechanism motor 50 receives an electrical current via the control system 48 (FIG. 4). A cylindrical drive wheel 56 may be fixed to the output shaft 54. A pulley 58 may be rotatably engaged with a mounting bracket 59, which in turn may be fixedly mounted to the intake port 32 or any other suitable location proximate thereto.

Figure 2:
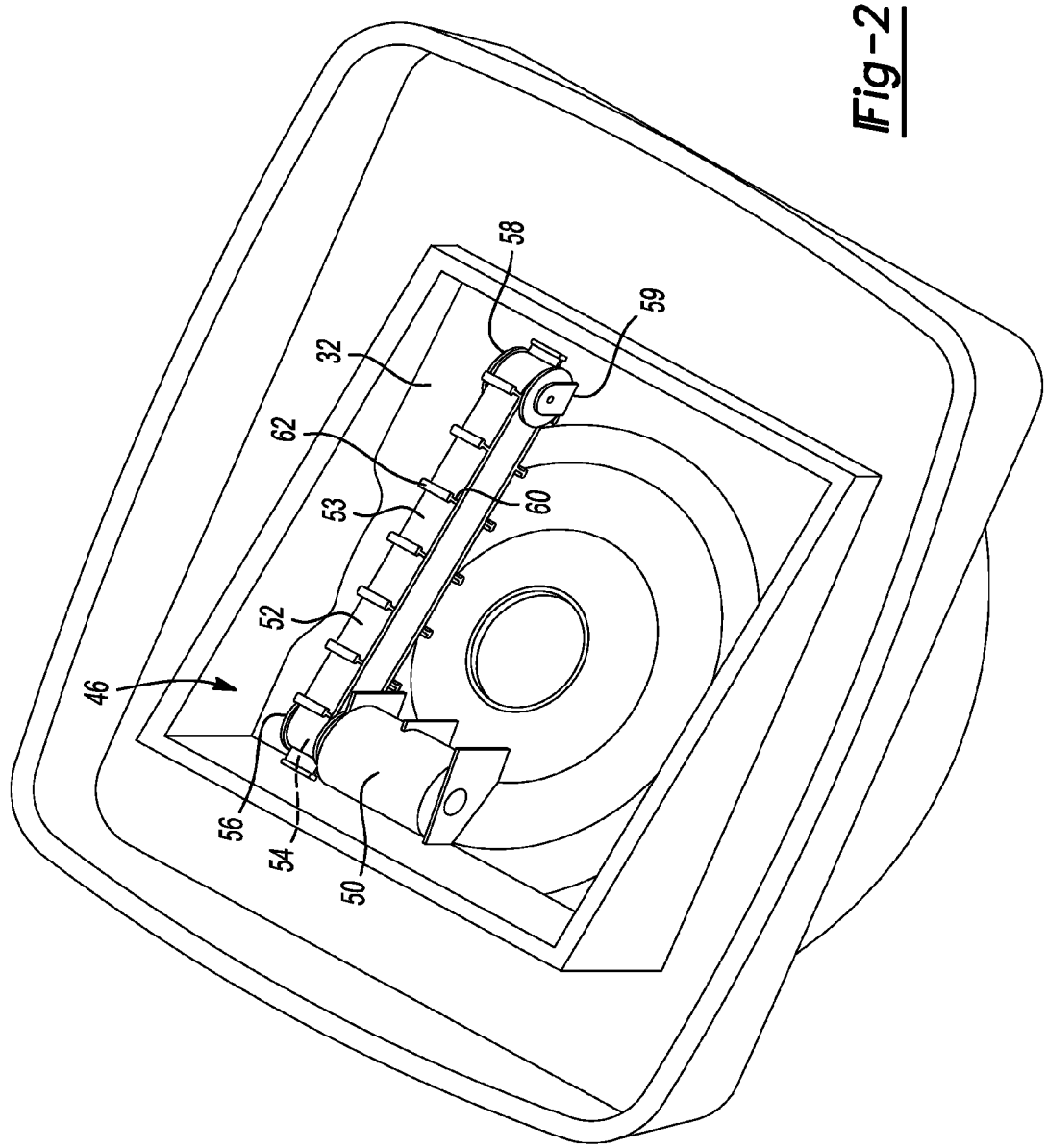
FIG. 2 is a perspective view of the filter cleaning system according to the principles of the present disclosure.

The belt 52 may be a flexible loop formed from an elastomer, polymer, and/or any other suitable material. The belt 52 may be disposed sufficiently taut around circumferences of the drive wheel 56 and the pulley 58, such that rotation of the drive wheel 56 (via the cleaning mechanism motor 50) may drive the belt 52 around the drive wheel 56 and the pulley 58 in a conveyor-belt fashion (FIGS. 2 and 3).

The belt 52 may include one or more fingers 60 protruding radially outward from an outer surface 53 of the belt 52. As shown in FIGS. 2 and 3, the fingers 60 may be generally rectangular and may include nubs 62 disposed on distal ends thereof. It should be appreciated that the fingers 60 may be a variety of shapes such as, for example, triangular, rounded, blade shape, or any other shape protruding from the outer surface 53 of the belt 52. The belt 52 may be disposed downstream of the filter 42 and situated such that the fingers 60 may contact the pleats 44 of the filter 42 (FIG. 3). It is further noted that the belt could be disposed upstream of the filter 42, however measures may need to be taken to isolate the cleaning mechanism motor 50 from the debris.

In this configuration, the cleaning mechanism motor 50 may cause the output shaft 54 to rotate, thereby causing the drive wheel 56 to rotate, which in turn causes the belt 52 to rotate around the drive wheel 56 and pulley 58 in a conveyor-belt (or looping) fashion. This rotation of the belt 52 may cause the fingers 60 to be dragged across the filter 42, strumming the pleats 44. This strumming action deflects and agitates and/or vibrates the filter 42 to disengage the debris from the filter 42, thereby causing the debris to fall from the filter 42 into the canister 14. The nubs 62 disposed on the ends of the fingers 60 may increase the agitation of the filter 42, as the fingers 60 strum the filter 42.

Debris attached to the filter 42 may impede airflow through the filter, which may decrease the efficiency of the vacuum 10. Disengaging the debris from the filter 42 improves the airflow through the filter 42, thereby optimizing a suction force of the suction device 18 and optimizing the efficiency and effectiveness of the vacuum 10.

With reference to FIG. 4, the control system 48 may include a user input 64, a control module (hereinafter "controller") 66, a vacuum power switch 67, a cleaning motor power switch 68, and drivers 70, 72. The control system 48 may be in electrical communication with a power source 74, the cleaning mechanism motor 50, and the vacuum motor 24. The control module or controller 66 can be an application-specific integrated circuit (ASIC), an electronic circuit, a processor (shared, dedicated, or a group) and memory that executes one or more software or firmware programs, a combinational logic circuit, or other suitable components that provide the described functionality.

Figure 5:
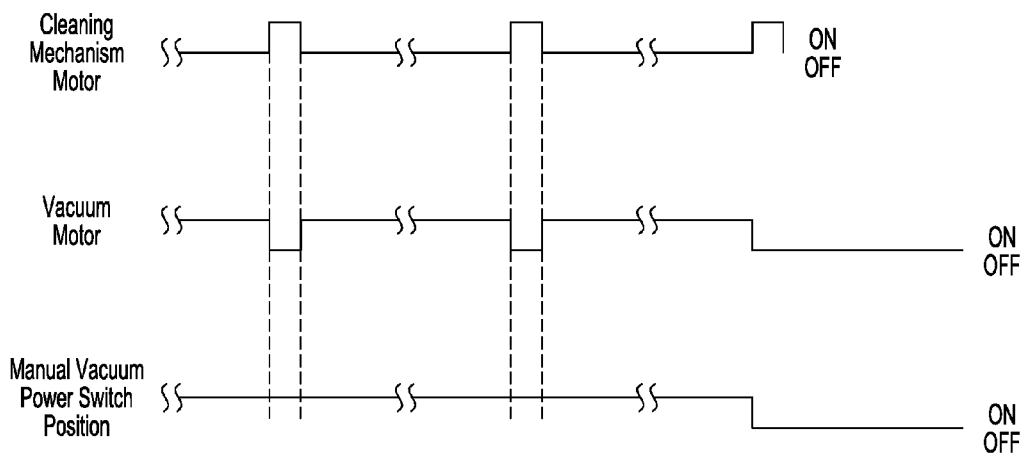
FIG. 5 is a diagram of an operational timing of the filter cleaning system relative to an operational timing of a vacuum motor according to the principles of the present disclosure.
Figure 6:
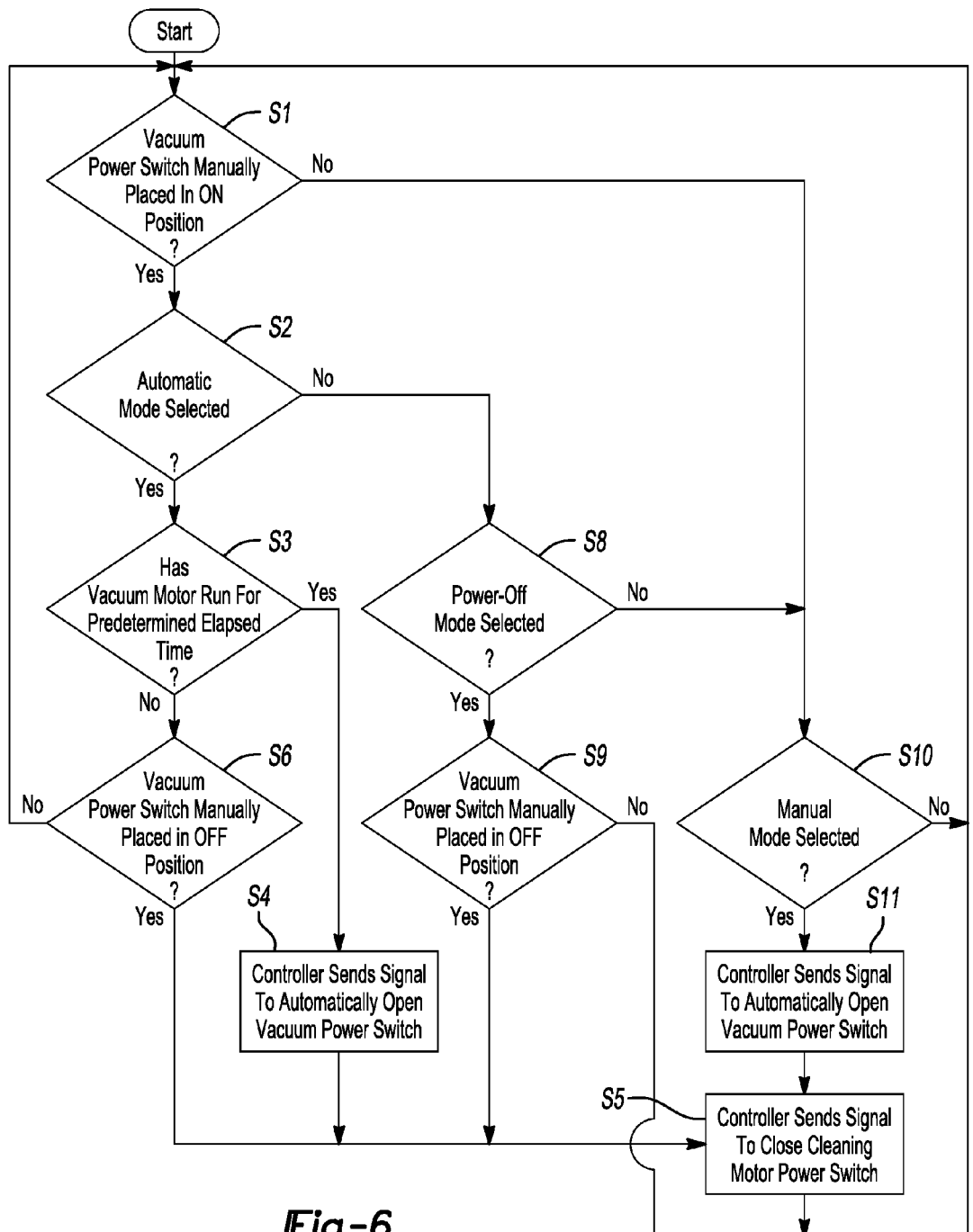
FIG. 6 is a diagram of the operational logic of the control system according to the principles of the present disclosure.

The vacuum 10 may be electrically connected to the power source 74, which may be an A/C wall outlet, an integrated battery, or any other suitable power supply. The vacuum power switch 67 may be a compound switch able to be manually closed and opened by the operator (i.e., placed in an "on" position and an "off" position, respectively) and automatically closed and opened by the controller 66 to complete and/or break the electrical connection between the power source 74 and the vacuum motor 24. Stated another way, the operator may operate the vacuum motor 24 (and hence the suction device 18) by manually placing the vacuum power switch 67 in the "on" position. The operator may turn off the vacuum motor by placing the vacuum power switch 67 in the "off" position. When the vacuum power switch 67 has been manually closed (placed in the "on" position), the controller 66 may cause the vacuum power switch 67 to automatically open (preventing electrical current from reaching the vacuum motor 24) and automatically close again (allowing electrical current to reach the vacuum motor 24) in response to predetermined events (FIGS. 4-6).

The user input 64 may allow the operator to selectively set one of a plurality of operational modes 76 (FIG. 1) for the filter cleaning system 22. The user input 64 may be a dial, a toggle switch, a plurality of buttons, or any other suitable means for allowing the operator to select the operational mode 76 of the filter cleaning system 22. The operational modes 76 may include an automatic clean mode, a power-off clean mode, a manual clean mode, and any other predetermined operational mode, or any combination thereof.

When the selector dial 64 is set to the automatic clean mode (step S2, FIG. 6) and the vacuum power switch 67 has been manually placed in the "on" position (step S1, FIG. 6), the controller 66 may begin tracking the amount of time the vacuum motor 24 runs. After the vacuum motor 24 runs for a predetermined elapsed time (step S3, FIG. 6), the controller 66 may send a signal causing the driver 70 to open the vacuum power switch 67 (step S4, FIG. 6), breaking the circuit between the power source 74 and the vacuum motor 24. The controller 66 may also send a signal causing the driver 72 to close the cleaning motor power switch 68 (step S5, FIG. 6), completing the circuit between the power source 74 and the cleaning mechanism motor 50, and allowing the cleaning mechanism motor 50 to receive an electrical current and drive the filter cleaning mechanism 46 (FIGS. 4-6).

After the cleaning mechanism motor 50 drives the filter cleaning mechanism 46 for a predetermined amount of time, the controller 66 may send a signal to the driver 72 to open the cleaning motor power switch 68, breaking the electrical connection between the power source 74 and the cleaning mechanism motor 50. The controller may then send a signal to the driver 70 closing the vacuum power switch 67, allowing electrical current to reach the vacuum motor 24 and drive the suction device 18 (FIGS. 4-6).

As shown in FIGS. 5 and 6, this process of disabling the vacuum motor 24 while actuating the cleaning mechanism motor 50 to clean the debris from the filter 42 may repeat until the operator manually opens the vacuum power switch 67 (placing the vacuum power switch in the "off" position) to shut off the vacuum motor 24 and the suction device 18. When the operator manually places the vacuum power switch 67 in the "off" position (step S6, FIG. 6), the controller 66 may send the signal to the driver 72 to close the cleaning motor switch 68 for a predetermined amount of time, allowing the cleaning mechanism motor 50 to drive the filter cleaning mechanism 46 (step S5, FIG. 6).

Alternatively, the operator could set the selector dial 64 to the power-off clean mode (step S8, FIG. 6), which may cause the controller 66 to refrain from closing the cleaning motor switch 68 until the operator manually sets the vacuum power switch 67 from the "on" position to the "off" position (step S9, FIG. 6). In this manner, operation of the vacuum motor 24 (and hence the suction device 18) will not be interrupted for operation of the filter cleaning system 22.

The operator may also manually command the control system 48 to actuate the cleaning mechanism motor 50 at any time by setting the selector dial 64 to manual clean mode (step S10, FIG. 6). Setting the selector dial 64 to manual clean mode may cause the controller 66 to immediately disable the vacuum motor 24 (step S11, FIG. 6) and actuate the cleaning mechanism motor 50 (step S5, FIG. 6).

The selector dial 64 may also include an off setting, which may prevent the filter cleaning system 22 from operating until the operator sets the selector dial 64 to another operational mode 76.

The filter cleaning system 22 may be more effective in removing debris from the filter 42 while the suction device 18 is disabled (i.e., preventing airflow from the suction inlet opening 36 to the exhaust port 30). In this configuration, agitation of the filter 42 may allow the debris accumulated thereon to fall from the filter 42 into the canister 14. It should also be appreciated that the control system 48 could cause the vacuum motor 24 to reverse the direction of the airflow through the filter 42 during the operation of the filter cleaning system 22 (i.e., causing the suction device 18 to force air from the intake port 32 through the filter 42 and into the canister 14) instead of disabling the suction device 18 as described above. Airflow in this direction may assist the filter cleaning system 22 in disengaging the debris from the filter 42 and forcing the debris into the canister 14.

It should be appreciated that the filter cleaning mechanism 46 is not limited to the embodiment described above. FIGS. 7-24 depict additional alternative embodiments of the filter cleaning mechanism 46 according to the present disclosure.

Figure 7:
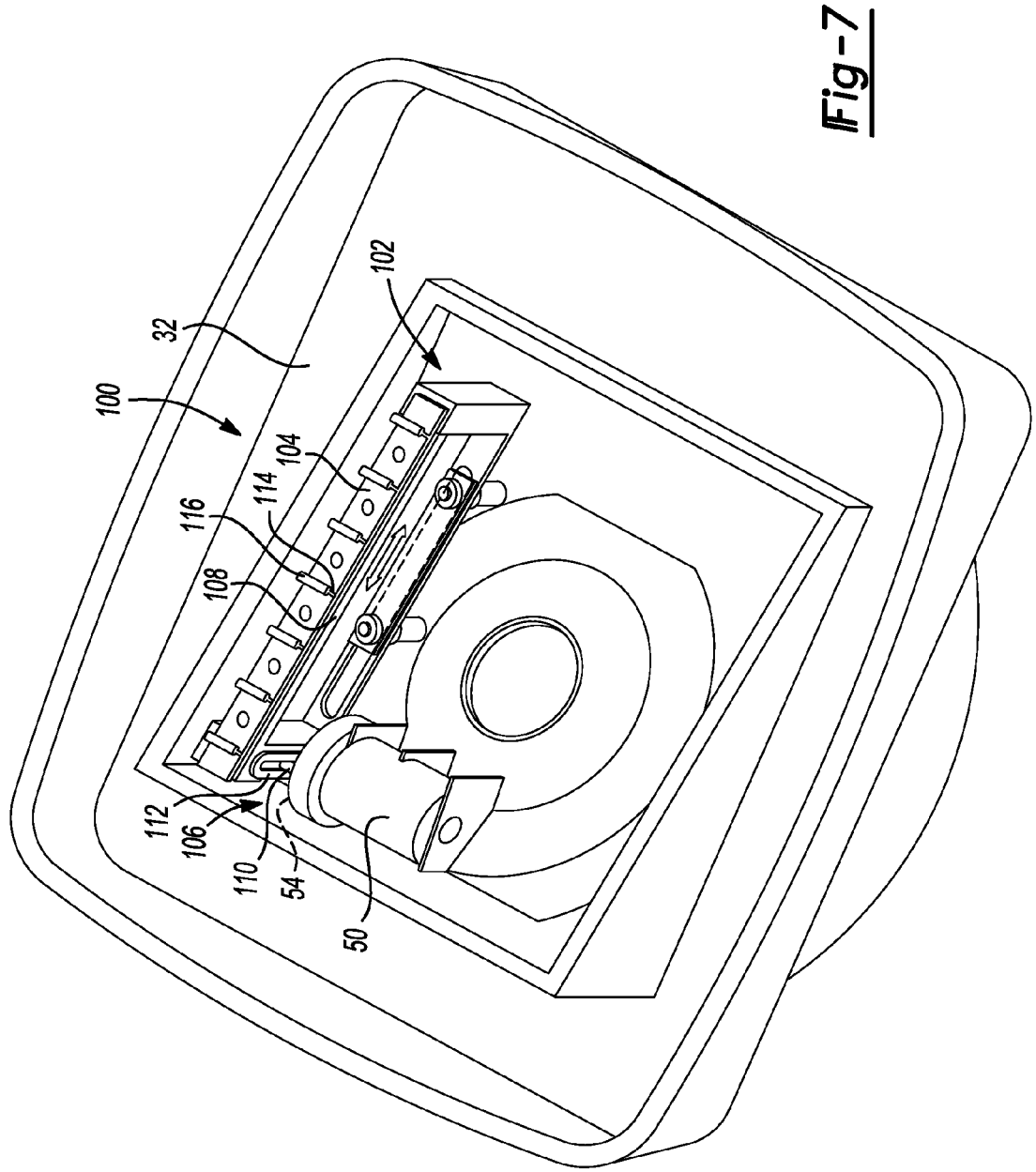
FIG. 7 is a perspective view of a filter cleaning system according to the principles of the present disclosure.
Figure 8:
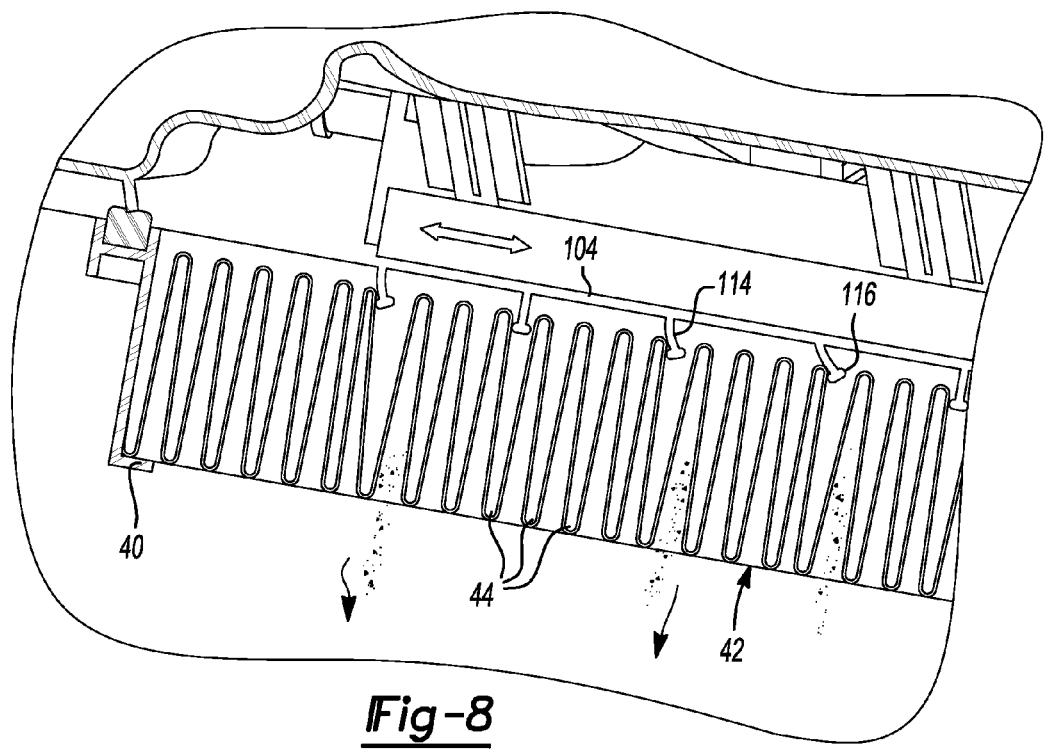
FIG. 8 is a cross-sectional view of the filter cleaning system of FIG. 7 engaged with a filter.

Referring now to FIGS. 7 and 8, a filter cleaning mechanism 100 is provided and may include the cleaning mechanism motor 50, a linear translation linkage 102, and a rake 104.

The linear translation linkage 102 may include a crank 106 and a slider 108. The crank 106 may include a pin 110 eccentrically fixed at a first end to the output shaft 54 of the cleaning mechanism motor 50 such that rotation of the output shaft 54 about its longitudinal axis causes the pin 110 to orbit about longitudinal axis of the output shaft 54.

The slider 108 may be an elongated member spanning the width of the filter housing 34 (FIG. 7). The slider 108 may be slidably engaged with one or more structural members which may be fixed to the intake port 32 or any other suitable location.

A second end of the pin 110 may be slidably engaged within a slot 112 disposed on the slider 108. The length of the slot 112 may be at least as large as the diameter of an orbit path of the pin 110 about a longitudinal axis of the output shaft 54.

The rake 104 may be a rigid, elongated member fixed to the slider 108. One or more fingers 114 may be disposed on the rake 104. The fingers 114 may be resiliently flexible and protrude from the rake 104. The rake 104 may be disposed downstream of the filter 42, such that the fingers 114 may contact the pleats 44 of the filter 42 (FIG. 8). The fingers 114 may be generally rectangular and may include nubs 116 disposed on distal ends thereof. It should be appreciated that the fingers 114 may be a variety of shapes such as, for example, rectangular triangular, rounded, blade shape, or any other shape protruding from the rake 104.

As described above, actuation of the cleaning mechanism motor 50 may cause the pin 110 to rotate about the longitudinal axis of the output shaft 54 in an orbital path. As the pin 110 rotates, it may reciprocate within the slot 112 in a first plane, while forcing the slider to linearly reciprocate in a second plane. In this manner, the crank 106 and the slider 108 may cooperate to cause the rake 104 to linearly reciprocate across the width of the filter housing 34, thereby converting rotational motion of the cleaning mechanism motor 50 into linear motion of the rake 104.

It should be appreciated that the filter cleaning mechanism 100 could include any suitable means for causing reciprocal motion of the rake 104, such as, for example, a solenoid, a linear motor, or any electro-mechanical device and/or linkage adapted to produce reciprocating linear motion or convert rotary motion into reciprocating linear motion.

As the rake 104 reciprocates, the fingers 114 are dragged across the filter 42, thereby strumming the pleats 44 as illustrated in FIG. 8. This strumming action deflects and agitates and/or vibrates the filter 42 to disengage the debris from the filter 42, thereby causing the debris to fall from the filter 42 into the canister 14. The nubs 116 disposed on the ends of the fingers 114 may increase the agitation of the filter 42, as the fingers 114 strum the filter 42.

Figure 10:
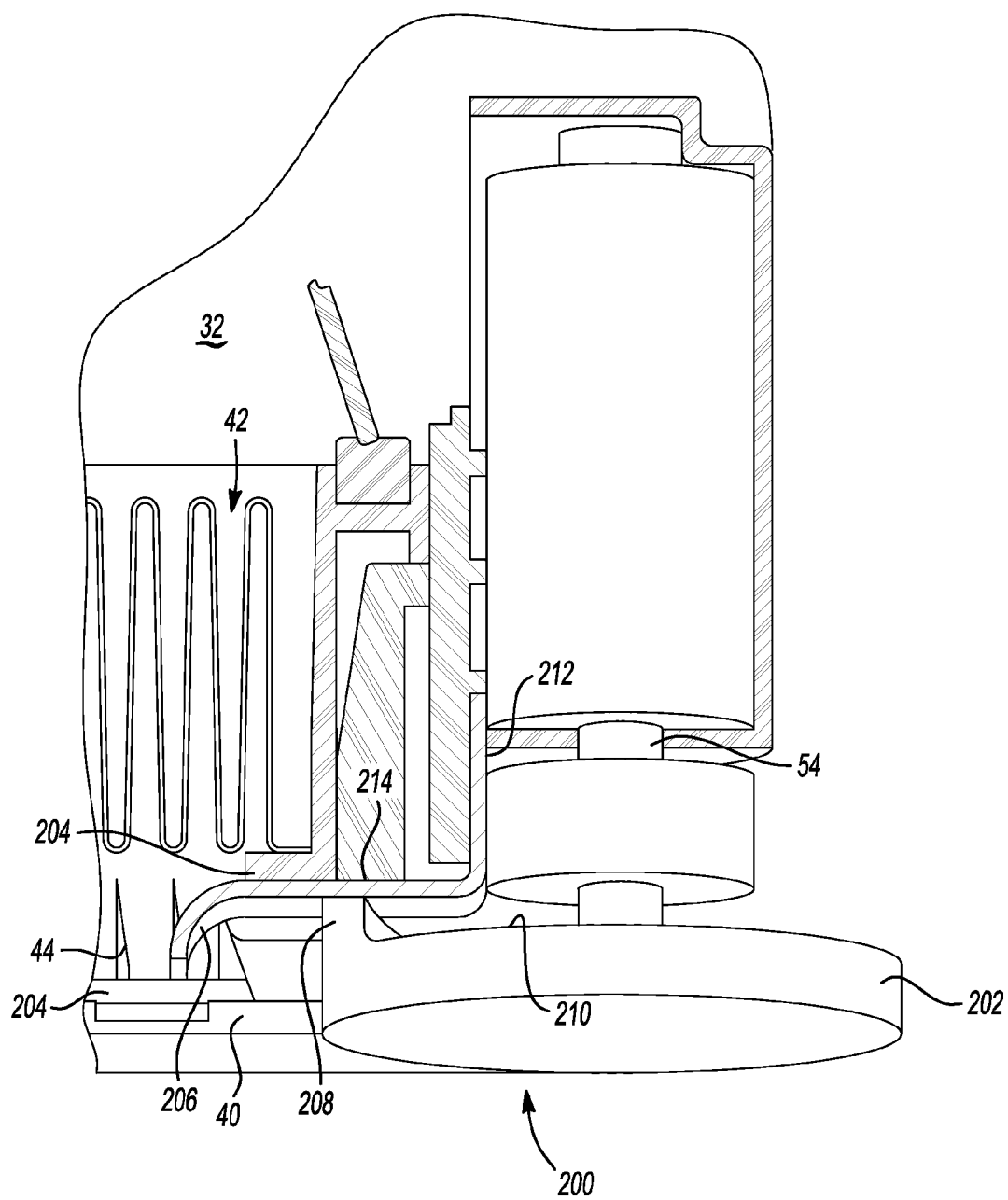
FIG. 10 is a cross-sectional view of the filter cleaning system of FIG. 9.
Figure 11:
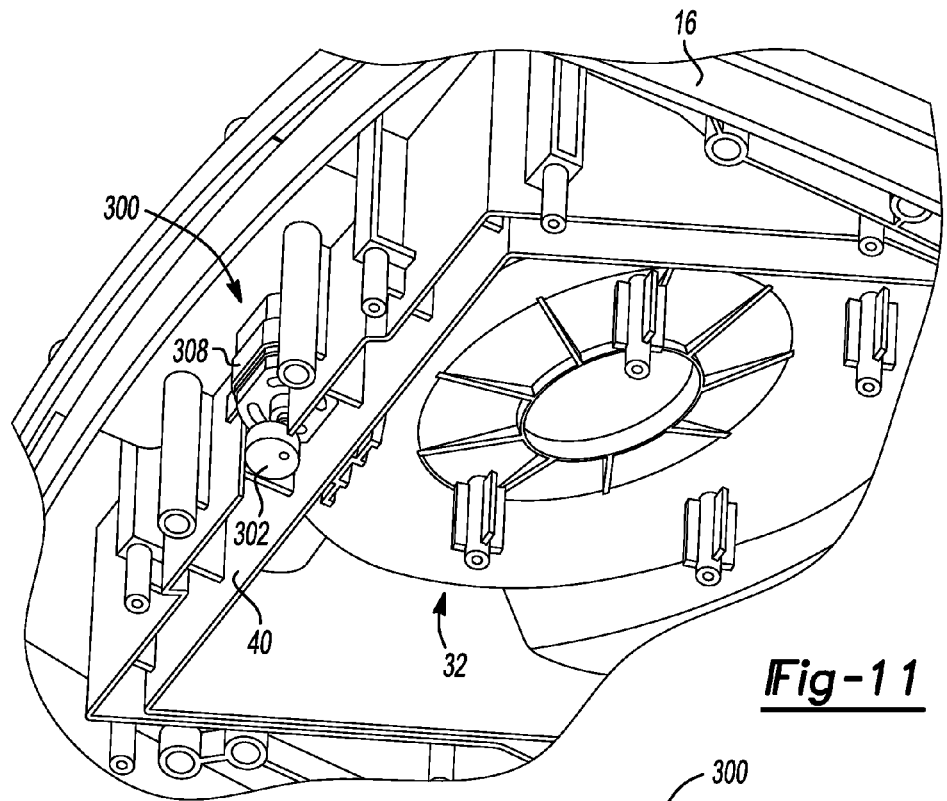
FIG. 11 is a perspective view of a filter cleaning system according to the principles of the present disclosure.
Figure 12:
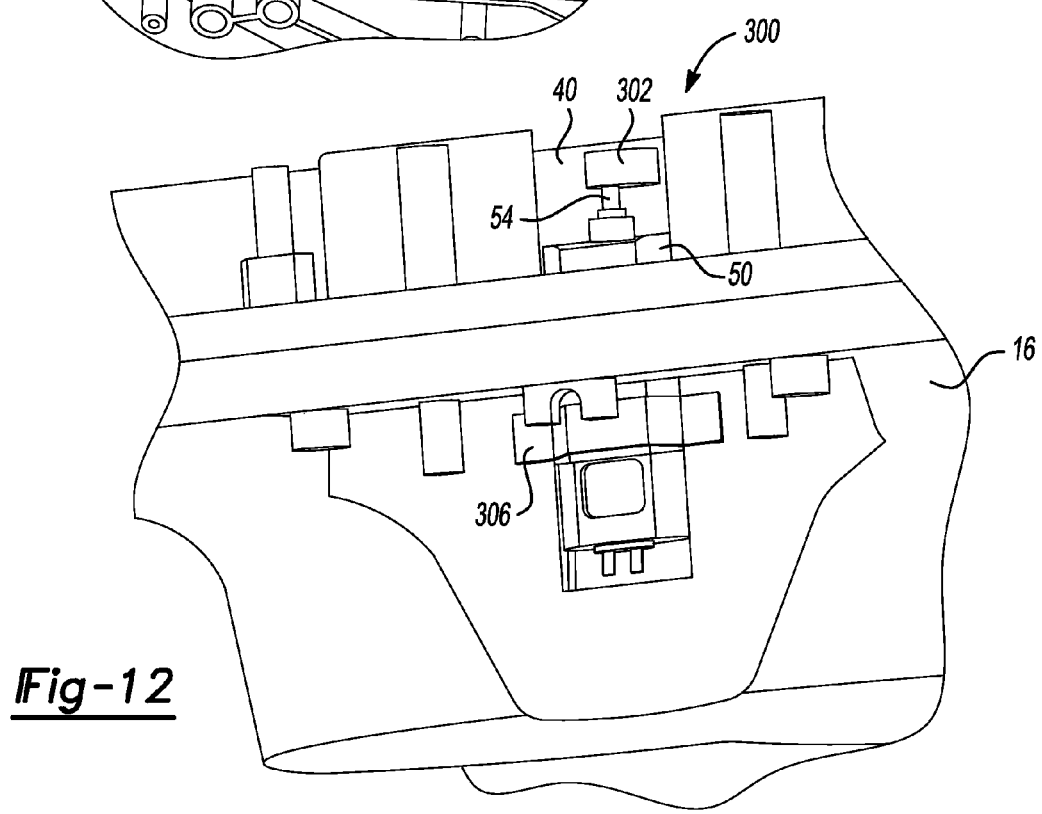
FIGS. 12 and 13 are perspective views of the filter cleaning system of FIG. 11.
Figure 13:
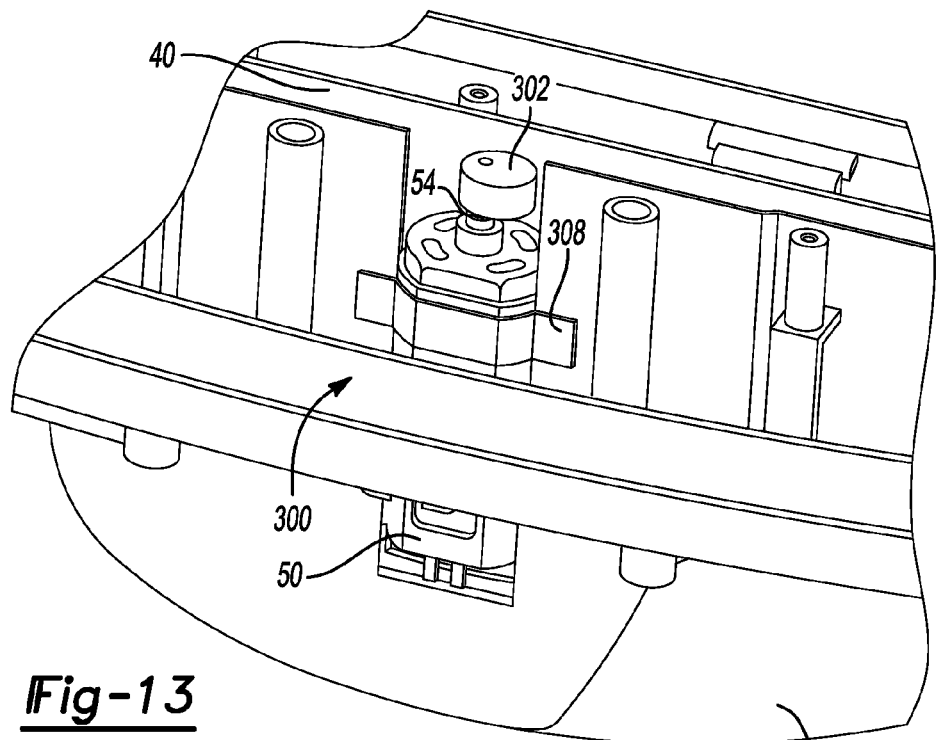

With reference to FIGS. 9 and 10, a filter cleaning mechanism 200 is provided and may include the cleaning mechanism motor 50, a cam 202, a filter insert 204, and a strike plate 206. The cam 202, filter insert 204, and the strike plate 206 may be disposed between the canister 14 and the filter 42 (i.e., upstream of the filter 42).

The cam 202 may be fixed to an end of the output shaft 54 of the cleaning mechanism motor 50. The cam 202 may be generally disk-shaped and may include a lobe 208. The lobe 208 may be an arced protuberance disposed on a face 210 of the cam 202.

The filter insert 204 may be disposed between the frame 40 and the filter 42 and is in contact with the filter 42. The filter insert 204 may surround the frame aperture 43 to avoid restricting airflow therethrough. The filter insert 204 may be thin metal, plastic, or any other material suitable to transmit vibration.

The strike plate 206 may include a fixed end 212, and a free end 214. The fixed end 212 may be disposed generally perpendicular relative to the free end, as shown in FIG. 10. The fixed end 212 may be bolted, welded, adhered, or otherwise suitably fixed to the frame 40 or any other suitable location such that the free end 214 may contact the filter insert 204 and the cam lobe 208. The free end 214 may cantilever through an opening 216 in the frame 40 (FIG. 9). The free end 214 may be flexible about the fixed end 212.

Upon receiving electrical current via the control system 48, the cleaning mechanism motor 50 may rotate the cam 202. As the cam 202 rotates, the lobe 208 may periodically contact the strike plate 206 which may resiliently deflect the free end 214 of the strike plate 206 into contact with the filter insert 204. The cleaning mechanism motor 50 may rotate the cam 202 at a sufficient frequency to cause the strike plate 206 to vibrate, thereby vibrating the filter insert 204. The vibration may transmit through the filter insert 204 and into the filter 42, whereby the filter 42 may be sufficiently agitated such that the debris may be shaken therefrom and fall into the canister 14. It should be appreciated that the filter cleaning mechanism 200 could operate without the strike plate 206, whereby the lobe 208 of the cam 202 could the vibrate filter insert 204 directly.

Referring now to FIGS. 11-14, another filter cleaning mechanism 300 according to the principles of the present disclosure is shown and may include the cleaning mechanism motor 50 and an eccentric mass 302 which may be fixed to the end of the output shaft 54 of the cleaning mechanism motor 50. The filter cleaning mechanism 300 may generate a vibration that may be transmitted to the filter 42, whereby the filter 42 may be sufficiently agitated such that the debris may be shaken therefrom and fall into the canister 14.

Eccentric mass 302 may be attached to the end of the output shaft 54 such that the rotation of the output shaft 54 about its longitudinal axis causes eccentric mass 302 to orbit about the longitudinal axis of the output shaft 54. The orbiting of the eccentric mass 302 may cause cleaning mechanism motor 50 to vibrate.

Figure 14:
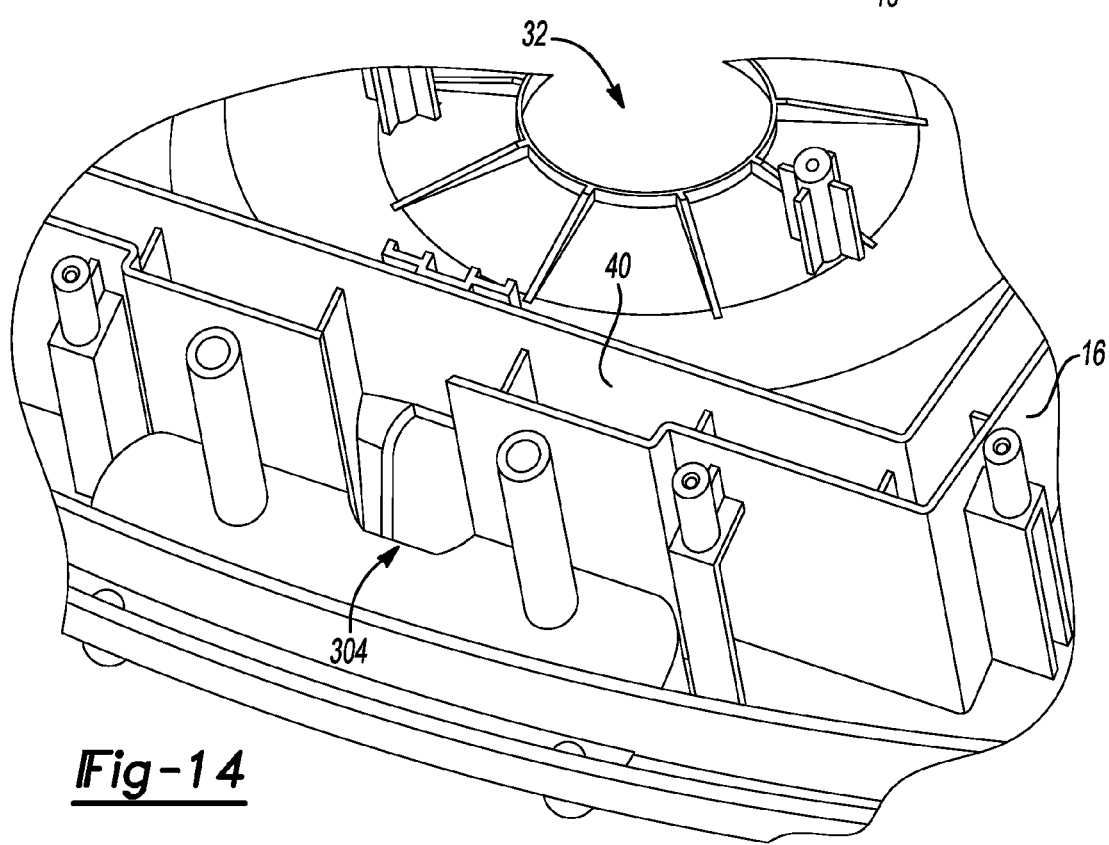
FIG. 14 is a perspective view of the vacuum head housing of the filter cleaning system of FIG. 11.
Figure 17:
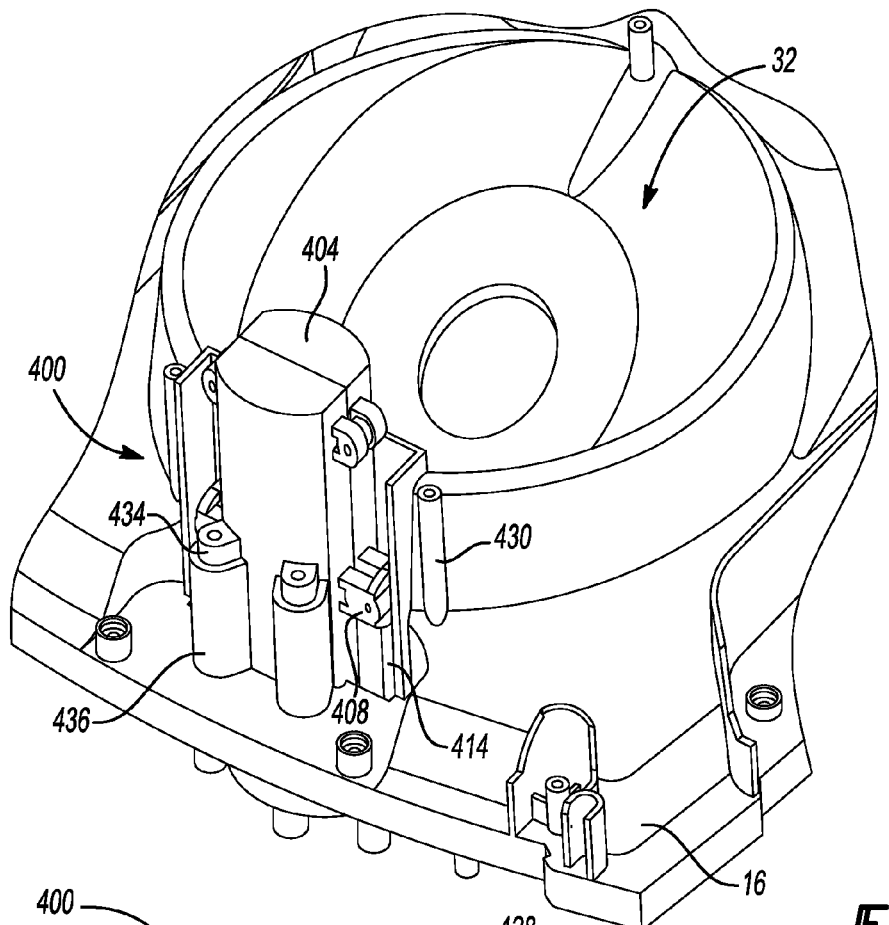
FIG. 17 is a perspective view of the filter cleaning system of FIG. 15 with the trap removed.

The vacuum head 16 may have an aperture or opening 304 extending therethrough. The opening 304 may be adjacent the intake port 32 and may be outside of the frame 40, as seen in FIG. 14. The cleaning mechanism motor 50 may be located in the opening 304 and may be in contact with the frame 40. The cleaning mechanism motor 50 may be secured in the opening 304 with upper and lower motor straps 306, 308. The motor straps 306, 308 may hold the cleaning mechanism motor 50 in place against the frame 40 during operation so that the vibration generated by the cleaning mechanism motor 50 is transmitted to the frame 40.

Upon receiving electrical current via the control system 48, the cleaning mechanism motor 50 may rotate eccentric mass 302 orbitally about the longitudinal axis of the output shaft 54. This orbiting motion may generate vibrations in the cleaning mechanism motor 50 that may be transmitted to the frame 40 due to the contact of cleaning mechanism motor 50 with the frame 40. The frame 40 may be in direct contact with the filter 42 or a component thereof so that the vibrations in the frame 40 may be transmitted to the filter 42. The transferring of the vibrations to the filter 42 may cause the filter 42 to be sufficiently agitated such that the debris may be shaken therefrom and fall into the canister 14.

It should be appreciated that the cleaning mechanism motor 50 and the eccentric mass 302 may be fully enclosed to prevent debris from contaminating the cleaning mechanism motor 50, the output shaft 54 and the eccentric mass 302. It should also be appreciated that the filter cleaning mechanism 300 could include any suitable means for causing vibrational motion of the frame 40. Additionally, it should be appreciated that the filter cleaning mechanism 300 may impart vibrations to components other than the frame 40 so long as such vibrations are transferred to the filter 42.

Referring now to FIGS. 15-24, another filter cleaning mechanism 400 according to the principles of the present disclosure is shown and may include the cleaning mechanism motor 50, an eccentric mass 402, and a housing 404.

The housing 404 may be a 2-piece housing and may be constructed to contain the cleaning mechanism motor 50 and the eccentric mass 402. The housing 404 may be positioned in an opening or aperture 406 in the vacuum head 16. Opening 406 may be adjacent the intake port 32.

Figure 18:
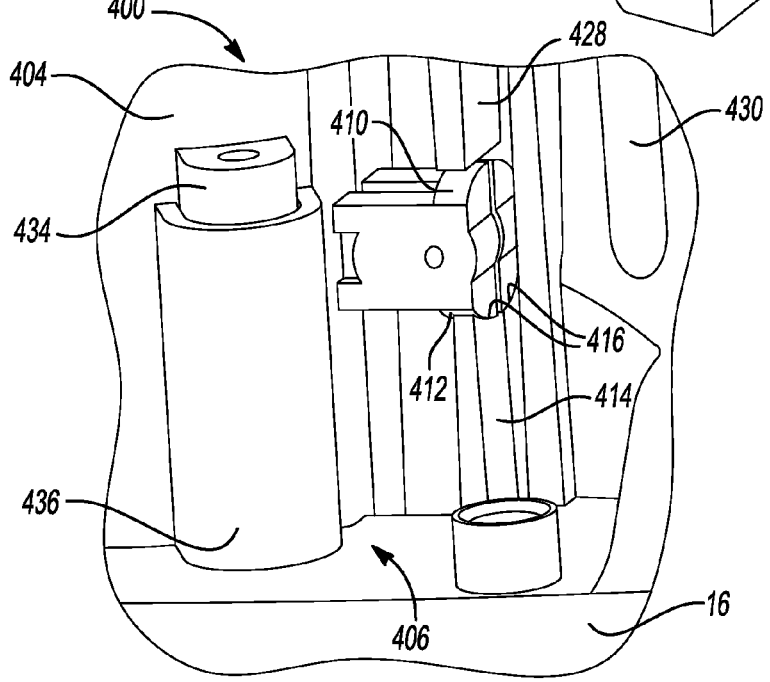
FIG. 18 is an enlarged perspective view of a portion of the filter cleaning system of FIG. 15.

As best seen in FIG. 18, housing 404 may include pivotal mounting members 408 that may extend outwardly therefrom. The pivotal mounting members 408 may have rounded upper and lower surfaces 410, 412. The lower surfaces 412 may be disposed on upwardly extending arms 414 of vacuum head 16 and which may have complementary concave surfaces 416. The engagement of the lower surfaces 412 of pivotal mounting members 408 with the concave surfaces 416 of the arms 414 may allow housing 404 to pivot along an axis defined by the pivotal mounting members 408.

A trap member 420 may assist coupling housing 404 to vacuum head 16. Trap member 420 may include a top surface 422, a pair of throughbores 424, a side wall 426 which may be cylindrical in shape and may match an exterior of the housing 404, and a pair of ribs 428. The bores 424 may align with fastening features 430 on the vacuum head 16. Fasteners, such as screws, bolts and the like may be inserted through the bores 424 and secured to the fastening features 430 to attach the trap member 420 to the vacuum head 16. The ribs 428 may be slightly spaced apart from the upper surfaces 410 of the pivotal mounting members 408 and may prevent pivotal mounting members 408 from disengaging with or falling off of the arms 414. The swinging of the housing 404 on the arms 414 may not be affected by the ribs 428. The side wall 426 can extend along a portion of the housing 404 which may face intake port 32.

The housing 404 may have additional attachment lugs 434 with bores therethrough. The lugs 434 may project outwardly from the surface of the housing 404 and may engage with fastening features 436 on the vacuum head 16. Fasteners may be used to secure lugs 434 to fastening features 436. The fasteners do not prevent or inhibit sufficient swinging of the housing 404 along the arms 414.

Figure 19:
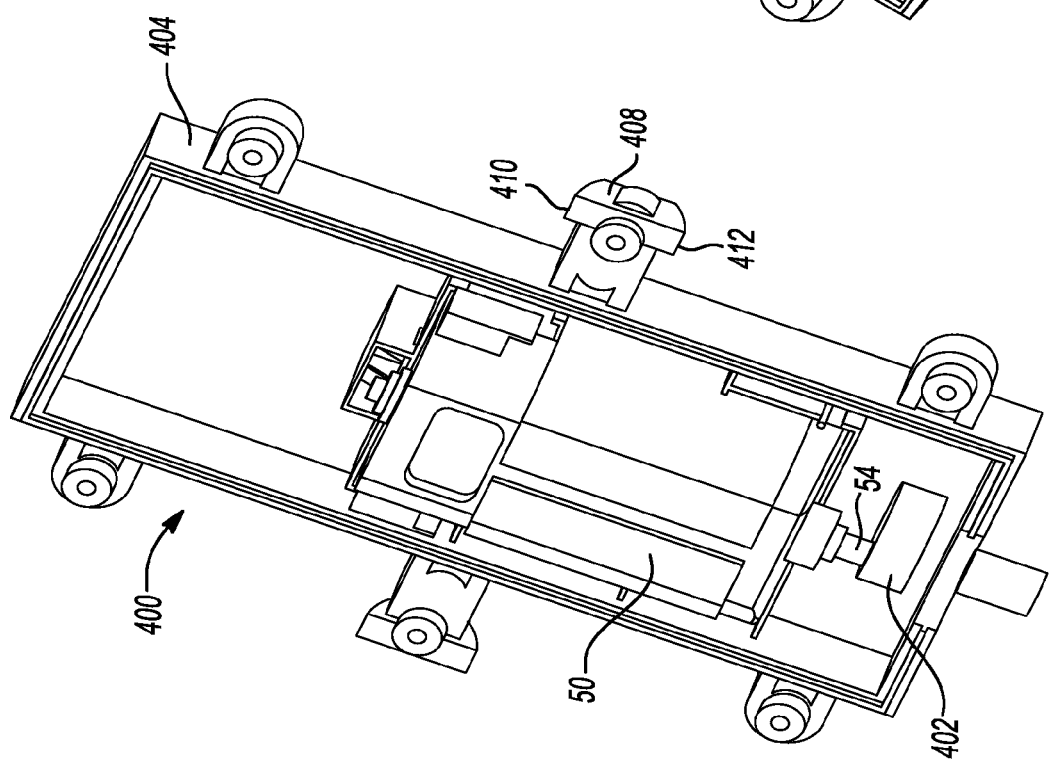
FIG. 19 is a perspective view of a filter cleaning mechanism that can be used in the filter cleaning system of FIG. 15.
Figure 22:
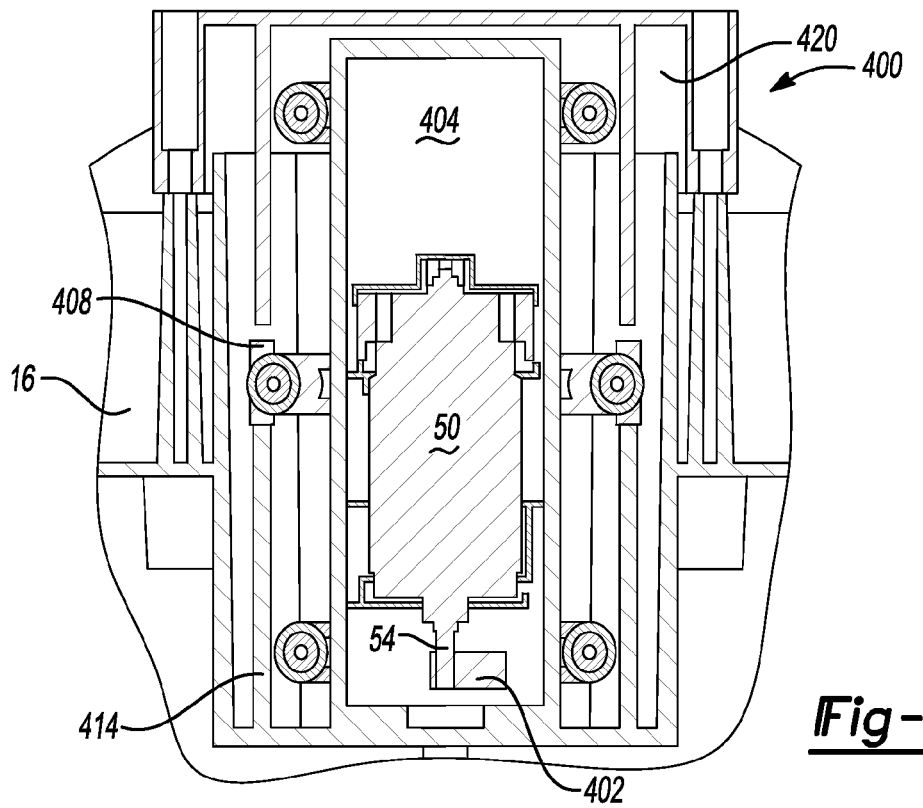
FIG. 22 is a cross-sectional view of the filter cleaning mechanism of FIG. 19 assembled in the filter cleaning system of FIG. 15.

Referring now to FIGS. 19 and 22, one piece of the housing 404 has been removed and the cleaning mechanism motor 50 therein can be seen. The eccentric mass 402 may be attached to the output shaft 54 of the cleaning mechanism motor 50. Rotation of the output shaft 54 about its longitudinal axis may cause the eccentric mass 402 to orbit about the longitudinal axis of the output shaft 54. The orbital motion of the eccentric mass 402 can impart vibrational forces to the cleaning mechanism motor 50 and the housing 404. The vibrational forces imparted to the housing 404 may cause the housing 404 along with the components therein to swing or pivot about the concave surfaces 416 of the arms 414.

Figure 20:
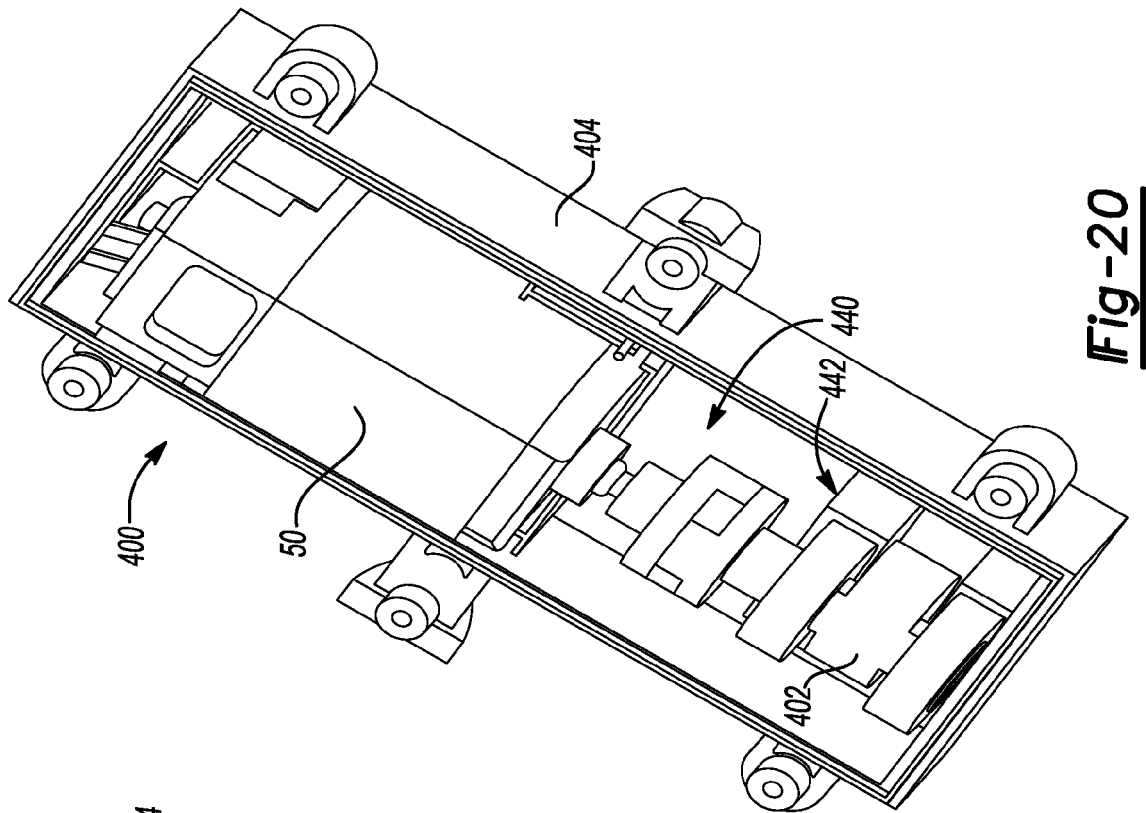
FIG. 20 is a perspective view of a different filter cleaning mechanism that can be used in the filter cleaning system of FIG. 15.
Figure 23:
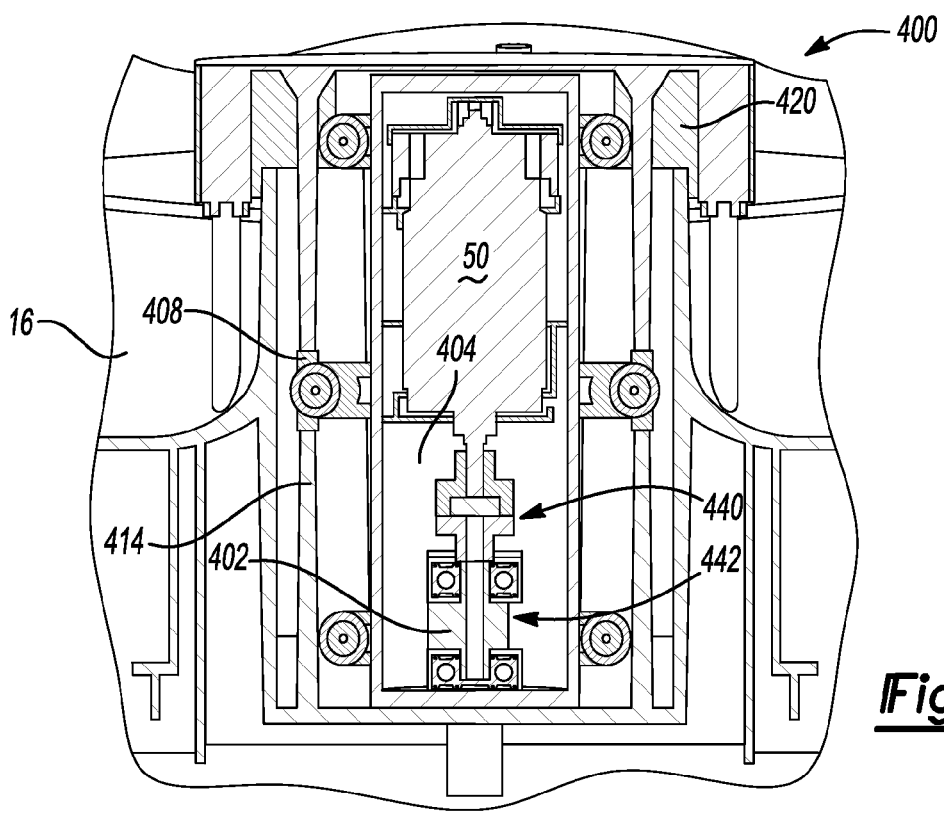
FIG. 23 is a cross-sectional view of the filter cleaning mechanism of FIG. 20 utilized in the filter cleaning system of FIG. 15.

Referring now to FIGS. 20-21 and 23, an alternate arrangement of filter cleaning mechanism 400 is shown. In this arrangement, the filter cleaning mechanism 400 may include a motor isolator assembly 440 and an eccentric mass assembly 442. The motor isolator assembly 440 can include first and second coupling members 444, 446 and a damping member 448. Damping member 448 may be resilient and flexible and may dampen vibration transmission between the first and second coupling members 444, 446. The damping member 448 may have a cruciform shape and may engage with a pair of projections 450 that may extend from each of the coupling members 444, 446 toward one another. The first coupling member 444 may be attached to the output shaft 54 of the cleaning mechanism motor 50. Rotation of the output shaft 54 may be transmitted to the second coupling member 446 through the engagement of the projections 450 and the damping member 448.

The eccentric mass assembly 442 may include the eccentric mass 402 which may have a pair of shafts 452, 454, and a pair of eccentric bearings 456, 458. The shafts 452, 454 are longitudinally aligned and offset from the center axis of the eccentric mass 402. The shafts 452, 454 may be engaged in and supported by the eccentric bearings 456, 458 in the housing 404. The shaft 452 may be coupled to the second coupling member 446 such that rotation of the second coupling member 446 causes the eccentric mass 402 to rotate about the axis of the shafts 452, 454.

The motor isolator assembly 440 and the eccentric mass assembly 442 may cause eccentric mass 402 to rotate about the axis of the shafts 452, 454 in response to rotation of the output shaft 54 of the cleaning mechanism motor 50. The rotation of the eccentric mass 402 may cause the housing 404 to pivot or swing on the concave surfaces 416 of the arms 414. The motor isolator assembly 440 may reduce adverse transmission of vibrations to the cleaning mechanism motor 50 via the output shaft 54. The motor isolator assembly 440 may decrease the adverse forces imparted on the cleaning mechanism motor 50 and may increase the useful life of the filter cleaning mechanism 400 utilizing such a configuration.

Figure 24:
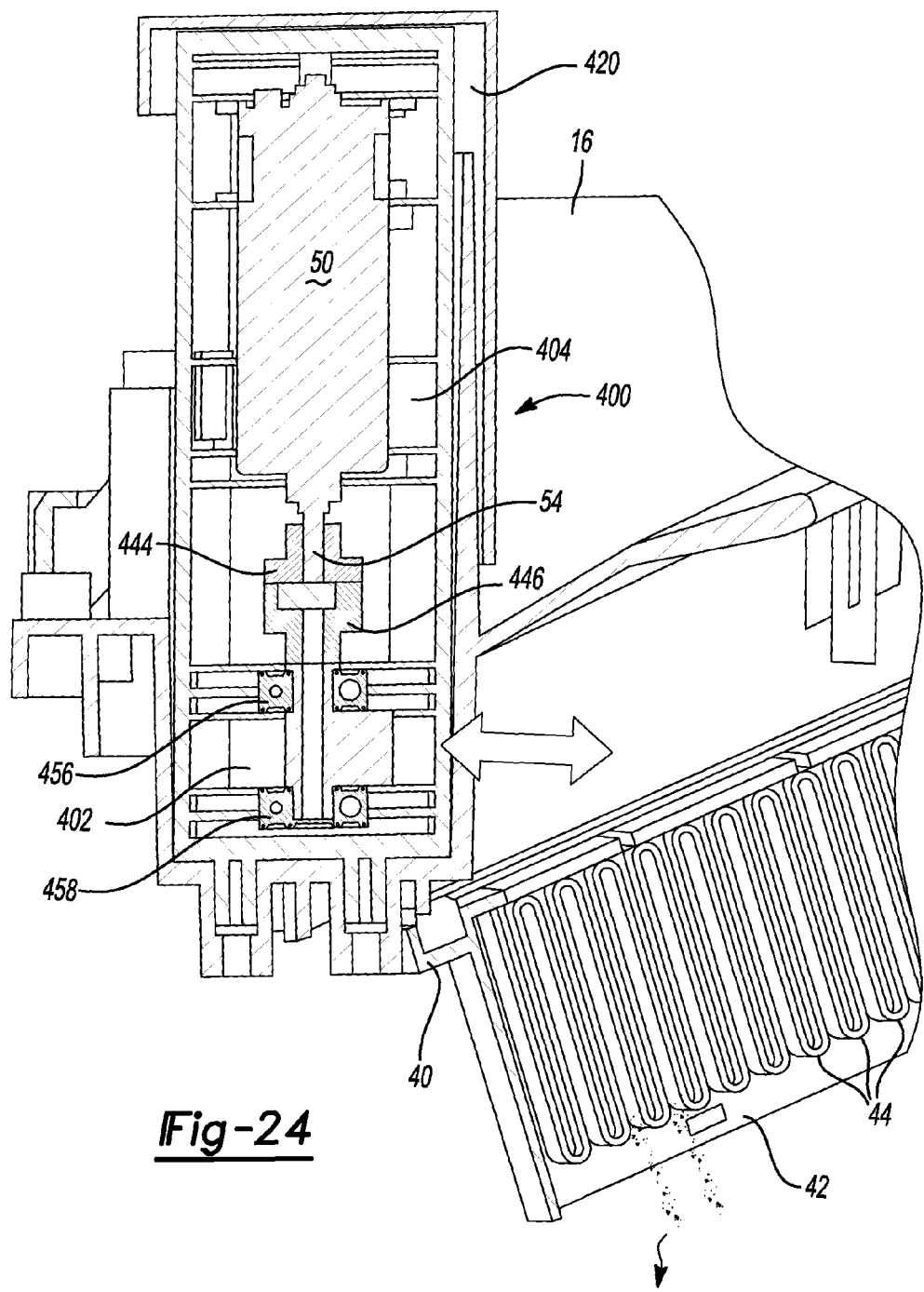
FIG. 24 is a cross-sectional of the filter cleaning system of FIG. 15 utilizing the filter cleaning mechanism of FIG. 20.

Referring now to FIG. 24, the housing 404 of the filter cleaning mechanism 400, when swinging or pivoting on the concave surfaces 416 of the arms 414, may engage with/hit against a portion of the vacuum head 16 adjacent the intake port 32 and with the frame 40 within which the filter 42 is disposed. The vibration which may be caused by rotation of the eccentric mass 402 may result in a swinging motion that may cause the housing 404 to repeatedly strike against the back portion of the vacuum head 16 and the frame 40. As a result, vibrations may be transmitted to the filter 42. The vibration imparted to the filter 42 may result in sufficient agitation of the filter 42 such that debris may be shaken therefrom and fall into the canister 14.

Upon the filter cleaning mechanism 400 receiving electrical current via the control system 48, the cleaning mechanism motor 50 may rotate eccentric mass 402. As the eccentric mass 402 rotates, the housing 404 may periodically contact both the vacuum head 16 and the frame 40 which may resiliently deflect into contact with the filter 42. The cleaning mechanism motor 50 may rotate the eccentric mass 402 at a sufficient frequency to cause filter 42 to vibrate, whereby the filter 42 may be sufficiently agitated such that debris may be shaken therefrom and fall into the canister 14.

It should be appreciated that the housing 404 may strike against and impart vibrational force to other components of the vacuum 10 which may then impart a vibrational force to the filter 42, dependent upon the design of the vacuum 10. Accordingly, the description of the specific components that the housing 404 strikes is merely exemplary.

While the filter cleaning systems according to the principles of the present disclosure are shown in reference to different embodiments, it should be appreciated that the different embodiments and the configurations utilized therein can vary from that shown. Additionally, it should also be appreciated that the various features in the various configurations can be mixed or combined in other manners than that shown to achieve the described functionality of causing sufficient agitation to the filter 42 such that debris may be removed therefrom and fall into the canister 14. Moreover, while control system 48 is described in detail with reference to filter cleaning system 22, control system 48 may be utilized to control filter cleaning mechanism 100, 200, 300, and 400. Thus, the description of the present disclosure is merely exemplary in nature and variations that do not depart from the gist of the disclosure are intended to be within the scope of the disclosure. Such variations are not to be regarded as a departure from the spirit and scope of the disclosure.

What is claimed is:

1. A vacuum comprising:
a housing defining a suction inlet opening and a debris chamber in communication with said suction inlet opening;
a suction device disposed in said housing for providing a vacuum pressure to said inlet opening;
a filter disposed in an airflow path between said suction inlet opening and said suction device;
a filter cleaning mechanism inducing a vibration in said filter thereby disengaging debris from said filter, said filter cleaning mechanism comprising:
a cam having a lobe; and
a strike plate disposed between said lobe and said filter,
an electric motor driving said cam thereby causing said lobe to periodically displace said strike plate and generate said vibration, wherein said lobe contacts said strike plate and induces said vibration in said filter through said strike plate.

2. The vacuum according to claim 1, wherein said filter cleaning mechanism further comprises a filter insert contacting said filter and said filter insert is disposed between said strike plate and said filter.

3. A vacuum comprising:
a housing defining a suction inlet opening and a debris chamber in communication with said suction inlet opening;
a suction device disposed in said housing for providing a vacuum pressure to said inlet opening;
a filter disposed in an airflow path between said suction inlet opening and said suction device;
a frame disposed within said housing and supporting said filter;
a filter cleaning mechanism inducing a vibration in said filter thereby disengaging debris from said filter, said filter cleaning mechanism comprising:
a motor coupled to said frame; and
an eccentric mass that is rotated by said motor,
wherein rotation of said eccentric mass by said motor induces said vibration in said filter via said frame.

4. A vacuum comprising:
a housing defining a suction inlet opening and a debris chamber in communication with said suction inlet opening;
a suction device disposed in said housing for providing a vacuum pressure to said inlet opening;
a filter disposed in an airflow path between said suction inlet opening and said suction device;
a frame disposed within said housing and supporting said filter;
a filter cleaning mechanism coupled to said housing and said frame for inducing a vibration in said filter thereby disengaging debris from said filter, said filter cleaning mechanism comprising:
a motor disposed within said housing; and
an eccentric mass that is rotated by said motor,
wherein said motor is moveably coupled to said housing and rotation of said eccentric mass by said motor causes said motor to move relative to said housing and induce said vibration in said frame to also vibrate said filter.

5. The vacuum of claim 4, wherein said motor is coupled to said first housing with at least one strap.

6. The vacuum of claim 4, wherein said filter cleaning mechanism includes a damping member disposed between an output shaft of said motor and said eccentric mass, said damping member damping vibration transmission to said motor due to rotation of said eccentric mass.

7. A vacuum comprising:
a first housing defining a suction inlet opening and a debris chamber in communication with said suction inlet opening;
a suction device disposed in said first housing for providing a vacuum pressure to said inlet opening;
a filter disposed in an airflow path between said suction inlet opening and said suction device;
a filter cleaning mechanism inducing a vibration in said filter thereby disengaging debris from said filter, said filter cleaning mechanism comprising:
a motor coupled to said first housing;
an eccentric mass that is rotated by said motor,
wherein rotation of said eccentric mass by said motor induces said vibration in said filter;
wherein said motor is moveably coupled to said first housing and rotation of said eccentric mass by said motor causes said motor to move relative to said first housing and induce said vibration in said filter;
wherein said motor and said eccentric mass swing about an axis relative to said first housing and induce said vibration in said filter; and
wherein said filter cleaning mechanism includes a second housing moveably coupled to said first housing, said motor and said eccentric mass are disposed in said second housing, and rotation of said eccentric mass by said motor causes said second housing to swing about said axis relative to said first housing.

8. The vacuum of claim 7, wherein said second housing contacts a frame member when moving relative to said first housing and causes said frame member to vibrate, and said frame member transmits said vibration to said filter.

9. The vacuum of claim 7, wherein said second housing is a multi-piece housing.

10. The vacuum of claim 7, wherein said filter cleaning mechanism further comprises a trap member that moveably couples a portion of said second housing to said first housing.

11. A vacuum comprising:
a housing defining a suction inlet opening and a debris chamber in communication with said suction inlet opening;
a suction device disposed in said housing for providing a vacuum pressure to said inlet opening, said suction device including a drive motor;
a filter disposed in an airflow path between said suction inlet opening and said suction device;
a filter cleaning mechanism for disengaging debris from said filter, said filter cleaning mechanism including an electrically actuated motor; and
a control module controlling said filter cleaning mechanism, said control module allowing a plurality of operating modes that causes an electrical current to actuate said motor of said filter cleaning mechanism by sending a signal to close a switch that electrically connects said motor of said filter cleaning mechanism to a power source,
wherein the plurality of operating modes includes:

an automatic mode wherein said control module commands operation of said filter cleaning mechanism in response to at least one predetermined event;
a power-off mode wherein said control module commands operation of said filter cleaning mechanism upon termination of operation of said suction device; and
a manual mode wherein said control module commands operation of said filter cleaning mechanism;
wherein said control module disables operation of said drive motor of said suction device prior to actuation of said filter cleaning mechanism.

12. The vacuum according to claim 11, wherein said at least one predetermined event includes a cessation of electrical current to said suction device.

13. The vacuum according to claim 11, wherein said at least one predetermined event includes a passage of a predetermined duration of operation of said suction device.

14. The vacuum according to claim 11, wherein said at least one predetermined event is customizable.

* * * * *